US012156054B2

(12) United States Patent
Dimou et al.

(10) Patent No.: US 12,156,054 B2
(45) Date of Patent: Nov. 26, 2024

(54) DYNAMIC INDICATION OF PHYSICAL DOWNLINK CONTROL CHANNEL MONITORING LOCATION

(71) Applicant: QUALCOMM Incorporated, San Diego, CA (US)

(72) Inventors: Konstantinos Dimou, San Francisco, CA (US); Yan Zhou, San Diego, CA (US); Tao Luo, San Diego, CA (US); Mahmoud Taherzadeh Boroujeni, San Diego, CA (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 16/923,993

(22) Filed: Jul. 8, 2020

(65) Prior Publication Data
US 2021/0105642 A1  Apr. 8, 2021

(30) Foreign Application Priority Data
Oct. 3, 2019 (GR) .............................. 20190100432

(51) Int. Cl.
*H04W 24/08* (2009.01)
*H04W 52/02* (2009.01)
(Continued)

(52) U.S. Cl.
CPC ....... *H04W 24/08* (2013.01); *H04W 52/0277* (2013.01); *H04W 72/23* (2023.01);
(Continued)

(58) Field of Classification Search
CPC ............... H04W 24/08; H04W 72/042; H04W 72/0486; H04W 80/02; H04W 72/14;
(Continued)

(56) References Cited

U.S. PATENT DOCUMENTS

| 2012/0207040 A1* | 8/2012 | Comsa ............. H04W 72/1215 370/252 |
| 2014/0051454 A1* | 2/2014 | Wirtanen ............. H04W 76/27 455/452.1 |

(Continued)

FOREIGN PATENT DOCUMENTS

WO  2019099388 A1  5/2019

OTHER PUBLICATIONS

3GPP TSG RAN WG1 #96; R1-1901710; Source: vivo, Title: UE adaptation to traffic and power consumption characteristics, Athens, Greece, Feb. 25-Mar. 1, 2019. (Year: 2019).*

(Continued)

*Primary Examiner* — Mohammed S Chowdhury
(74) *Attorney, Agent, or Firm* — Muncy, Geissler, Olds & Lowe, P.C.

(57) ABSTRACT

Various aspects of the present disclosure generally relate to wireless communication. In some aspects, a UE may monitor a set of operational conditions associated with the UE. Based on the monitoring, the UE may transmit a request for an indication identifying a PDCCH monitoring location associated with receiving a next DCI communication. A base station may receive the request and determines whether to grant the request. Based on the determination, the base station may selectively transmit the indication to the UE. The UE may monitor in the PDCCH monitoring location if the indication is received in response to the request.

25 Claims, 15 Drawing Sheets

500 →

515
Monitoring in the PDCCH monitoring location based at least in part on indication 505
Indication of PDCCH monitoring location of next DCI

UE

510
Next DCI

Base station

(51) Int. Cl.
*H04W 72/23* (2023.01)
*H04W 72/52* (2023.01)
*H04W 72/53* (2023.01)
*H04W 80/02* (2009.01)

(52) U.S. Cl.
CPC ............ *H04W 72/52* (2023.01); *H04W 72/53* (2023.01); *H04W 80/02* (2013.01)

(58) Field of Classification Search
CPC ......... H04W 52/0277; H04W 72/0493; H04W 48/12; H04W 72/1289; H04W 72/1284; Y02D 30/70; H04L 5/0053; H04L 5/0091
See application file for complete search history.

(56) References Cited

U.S. PATENT DOCUMENTS

| | | | |
|---|---|---|---|
| 2016/0066279 A1* | 3/2016 | Lee | H04W 52/24 370/311 |
| 2016/0080133 A1* | 3/2016 | Golitschek Edler von Elbwart | H04W 72/0406 370/280 |
| 2016/0112181 A1* | 4/2016 | Tabet | H04W 72/0413 370/296 |
| 2017/0289993 A1* | 10/2017 | Yerramalli | H04L 5/0094 |
| 2018/0278309 A1* | 9/2018 | Raghavan | H04B 7/0639 |
| 2018/0368172 A1 | 12/2018 | Li et al. | |
| 2019/0306842 A1* | 10/2019 | Cirik | H04B 7/0617 |
| 2019/0349061 A1* | 11/2019 | Cirik | H04L 1/1861 |
| 2020/0100248 A1* | 3/2020 | Kim | H04L 5/0092 |
| 2020/0314811 A1* | 10/2020 | Lin | H04L 5/0094 |
| 2020/0404638 A1* | 12/2020 | Deogun | H04L 5/0091 |
| 2021/0014893 A1* | 1/2021 | Park | H04L 5/0092 |
| 2021/0084507 A1* | 3/2021 | Takeda | H04W 72/042 |
| 2021/0185652 A1* | 6/2021 | Rune | H04L 5/0053 |
| 2021/0306868 A1* | 9/2021 | Johansson | H04B 7/0695 |
| 2021/0376908 A1* | 12/2021 | Sun | H04W 16/28 |

OTHER PUBLICATIONS

3GPP TSG RAN WG1 Meeting #96; R1-1902025; Source: CATT, Title: UE Power saving schemes and power saving signal/channel, Athens, Greece, Feb. 25-Mar. 1, 2019. (Year: 2019).*

3GPP TSG-RAN WG1 Meeting #96bis; Tdoc R1-1905470, Source: Ericsson; Title: PDCCH monitoring related aspects of power savings, Xi'an, China, Apr. 8-Apr. 12, 2019. (Year: 2019).*

3GPP TSG RAN WG1 #98; R1-1909221, Source: OPPO, Title: Discussion on PDCCH monitoring Reduction, Prague, Czech, Aug. 26-30, 2019. (Year: 2019).*

ETRI: "PDCCH Design for Multi-Beam Operation", 3GPP TSG RAN WG1 Meeting #91, 3GPP Draft; R1-1720231 PDCCH Design for Multi-Beam Operation—Final, 3rd Generation Partnership Project (3GPP), Mobile Competence Centre; 650, Route Des Lucioles; F-06921 Sophia-Antipolis Cedex ; France, vol. RAN WG1, No. Reno, USA; Nov. 27, 2017-Dec. 1, 2017, Nov. 18, 2017 (Nov. 18, 2017), pp. 1-6, XP051369867, Retrieved from the Internet: URL: http://www.3gpp.org/ftp/tsg%5Fran/WG1%5FRL1/TSGR1%5F91/Docs/ [retrieved on Nov. 18, 2017] Sections 1, 2.1 and 2.2 and proposal 2; figures 3.4; table 1.

International Search Report and Written Opinion—PCT/US2020/054084—ISAEPO—Dec. 18, 2020.

* cited by examiner

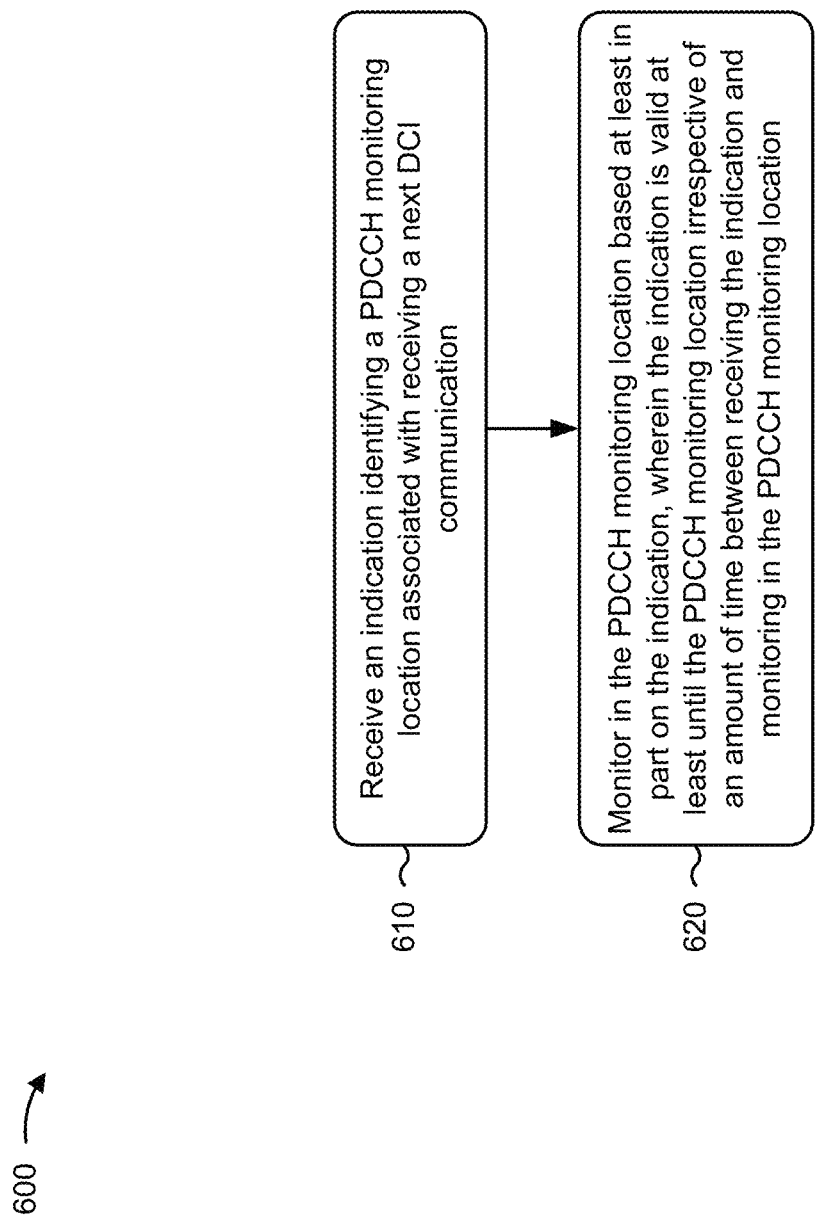

DYNAMIC INDICATION OF PHYSICAL DOWNLINK CONTROL CHANNEL MONITORING LOCATION

CROSS-REFERENCE TO RELATED APPLICATION

The present Application for patent claims priority under 35 U.S.C. § 119 to Greek Patent Application No. 20190100432, entitled "DYNAMIC INDICATION OF PHYSICAL DOWNLINK CONTROL CHANNEL MONITORING LOCATION", filed with the Greek Patent and Trademark Office on Oct. 3, 2019, and assigned to the assignee hereof and hereby expressly incorporated herein by reference in its entirety.

FIELD OF THE DISCLOSURE

Aspects of the present disclosure generally relate to wireless communication and to techniques and apparatuses for dynamic indication of physical downlink control channel (PDCCH) monitoring location.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a wireless communication system, such as an NR system, a downlink control information (DCI) communication may include control information, such as information associated with resource allocation (e.g., a set of resources to be used for a downlink shared channel, a set of resources to be used for an uplink shared channel, and/or the like), a transport format, and/or one or more other items of control information. Such a DCI communication is carried in a physical downlink control channel (PDCCH), which is communicated in one or more control resource sets (CORE-SETs).

A UE may be configured to monitor a PDCCH so that the UE can detect a DCI communication intended for the UE. In a typical communication scenario, the UE performs a blind search for a DCI communication in every slot (e.g., by attempting to decode the PDCCH in one or more CORE-SETs). However, this so-called blind decoding results in significant power consumption at the UE. For example, in the typical communication scenario described above, over 40% of total UE power may be consumed by the UE monitoring the PDCCH without any scheduling grant.

The power consumption issue persists even in scenarios in which it is not obvious that a UE would need to frequently monitor for DCI communications, such as when the UE is configured with semi-persistent scheduling (SPS) or a configured grant. For example, the UE may need to monitor for a DCI communication in association with activating the SPS/configured grant. As another example, the UE configured with the SPS/configured grant may need to monitor for a DCI communication after a beam quality issue causes the UE to fail to receive a downlink communication (e.g., a physical downlink shared channel (PDSCH) communication). Here, after failing to receive (e.g., failing to decode) the downlink communication, the UE may transmit a negative acknowledgment (NACK) indicating the beam quality issue. After transmitting the NACK, the UE may monitor (within one or more CORESETs) for a DCI communication associated with initiating a beam sweep for beam re-selection/adaptation and re-transmission of downlink communication. This issue is particularly prevalent when operating in a high frequency range, such as Frequency Range 2 (FR2), because beam quality issues are more likely in high frequency ranges. Thus, monitoring for DCI communications can result in high UE power consumption even where it is not obvious that a UE would need to frequently monitor for DCI communications.

Some aspects of the present disclosure relate to various triggering mechanisms for transmission of indications of PDDCH monitoring locations. For example, selective triggering of requests for indications of PDDCH monitoring locations may facilitate reduced power consumption at the UE, less system interference and less system overhead.

In an aspect of the disclosure, a method, a computer-readable medium, and an apparatus are provided. The apparatus may be a UE. The UE may monitor a set of operational conditions associated with the UE. The UE may further transmit, based on the monitoring, a request for an indication identifying a physical downlink control channel (PDCCH) monitoring location associated with receiving a next downlink control information (DCI) communication. The UE may further monitor in the PDCCH monitoring location if the indication is received in response to the request.

In another aspect of the disclosure, a method, a computer-readable medium, and an apparatus are provided. The apparatus may be a base station. The base station may receive, from a user equipment (UE), a request for an indication identifying a physical downlink control channel (PDCCH) monitoring location associated with transmitting a next downlink control information (DCI) communication. The base station may further determine whether to grant the request.

Aspects generally include a method, apparatus, system, computer program product, non-transitory computer-readable medium, user equipment, base station, wireless communication device, and/or processing system as substantially described herein with reference to and as illustrated by the accompanying drawings, appendix, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
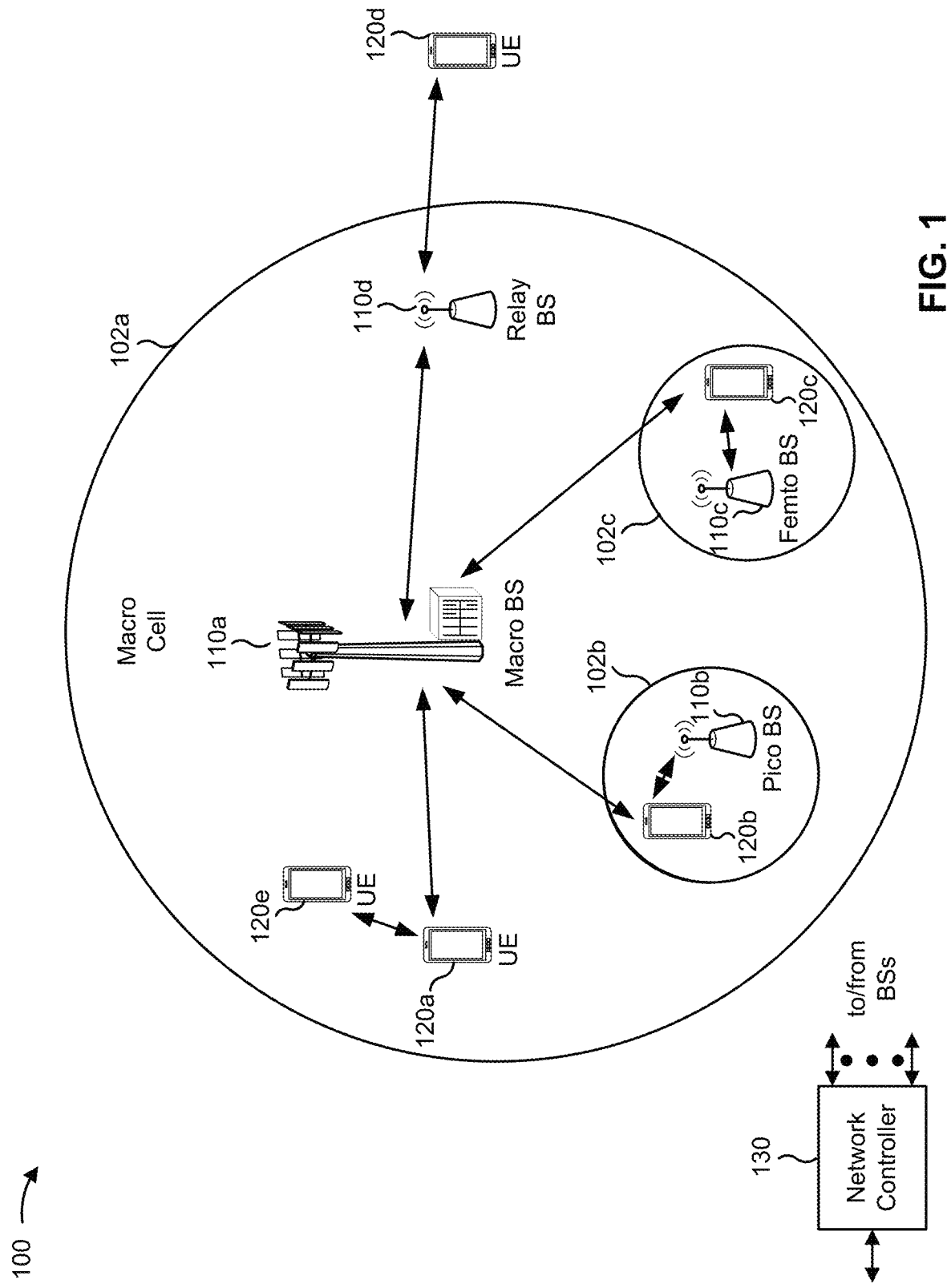
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
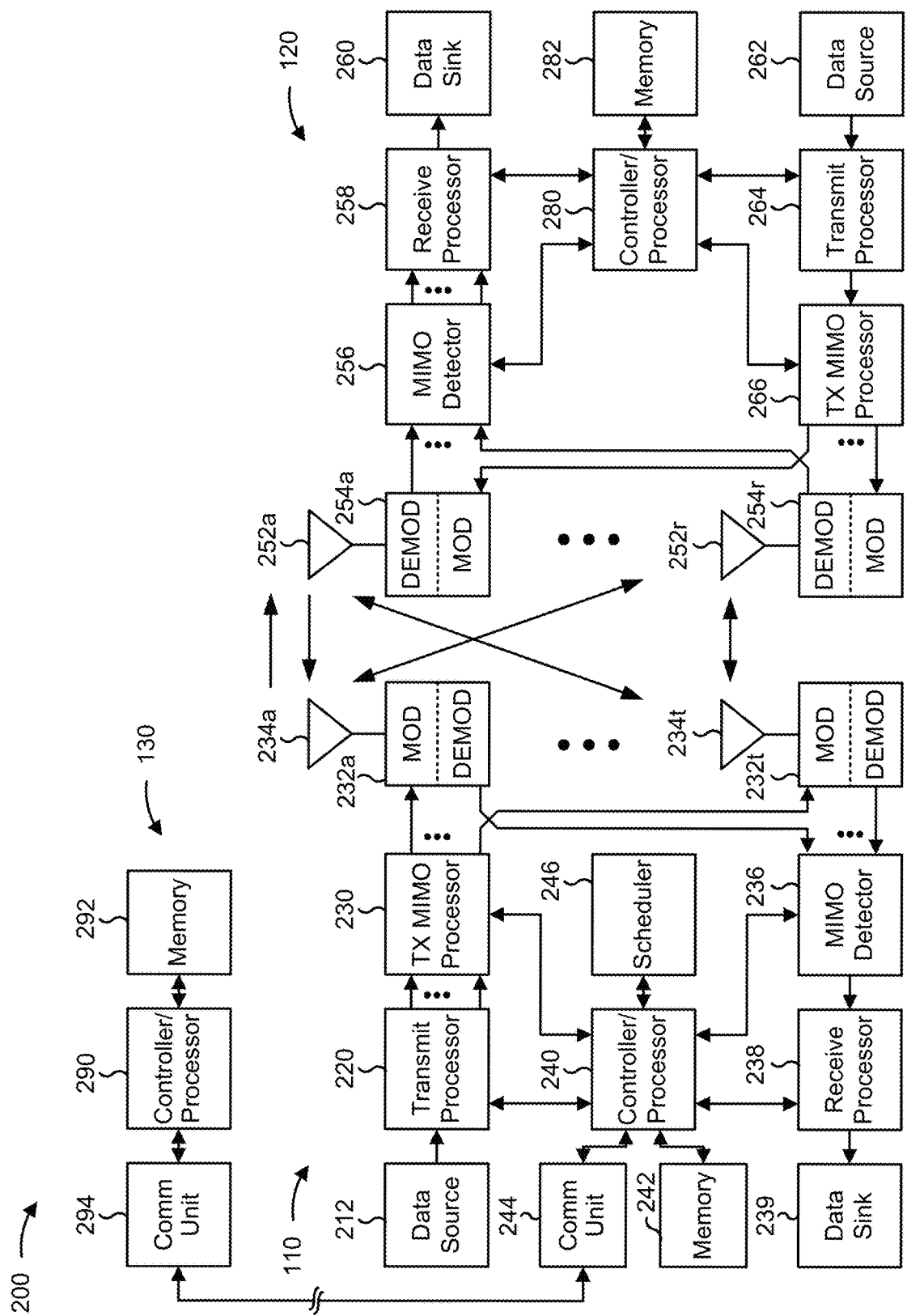
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with dynamic indication of PDCCH monitoring location, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for receiving an indication identifying a PDCCH monitoring location associated with receiving a next DCI communication; means for monitoring in the PDCCH monitoring location based at least in part on the indication, wherein the indication is valid at least until the PDCCH monitoring location irrespective of an amount of time between receiving the indication and monitoring in the PDCCH monitoring location; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting an indication identifying a PDCCH monitoring location associated with transmitting a next DCI communication, wherein the indication is valid at least until the PDCCH monitoring location irrespective of an amount of time between receiving the indication and monitoring in the PDCCH monitoring location; means for transmitting the next DCI communication after transmitting the indication; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
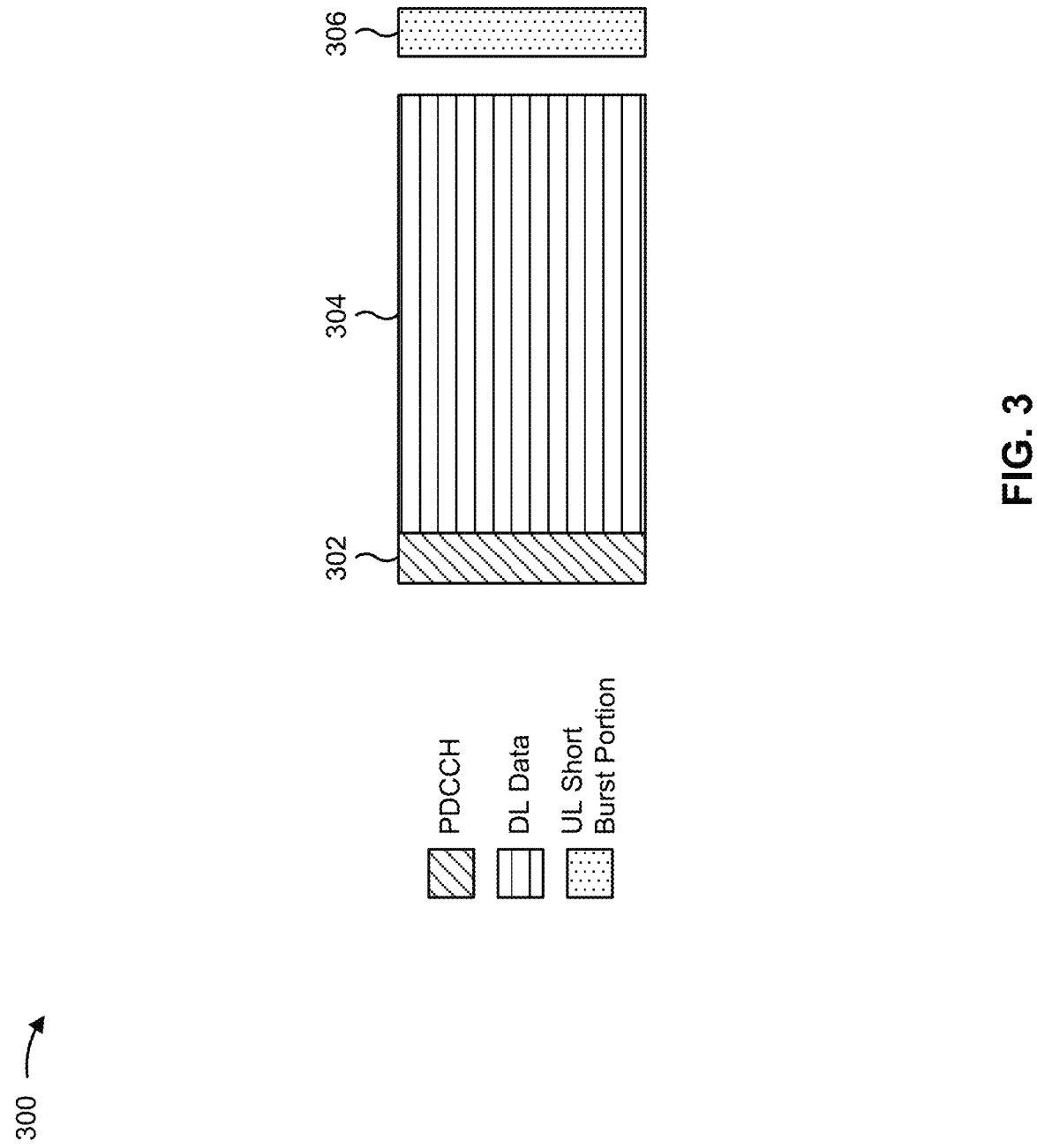
FIG. 3 is a diagram illustrating an example of a downlink (DL)-centric slot, in accordance with various aspects of the present disclosure.

FIG. 3 is a diagram 300 showing an example of a DL-centric slot or wireless communication structure. The DL-centric slot may include a control portion 302. The control portion 302 may exist in the initial or beginning portion of the DL-centric slot. The control portion 302 may include various scheduling information and/or control information corresponding to various portions of the DL-centric slot. In some configurations, the control portion 302 may be a physical DL control channel (PDCCH), as indicated in FIG. 3. In some aspects, the control portion 302 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 304. The DL data portion 304 may sometimes be referred to as the payload of the DL-centric slot. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PDSCH).

The DL-centric slot may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric slot. For example, the UL short burst portion 306 may include feedback information corresponding to the control portion 302 and/or the data portion 304. Non-limiting examples of information that may be included in the UL short burst portion 306 include an ACK signal (e.g., a physical uplink control channel (PUCCH) ACK, a physical uplink shared channel (PUSCH) ACK, an immediate ACK), a NACK signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 3 is provided as an example. Other examples may differ from what is described with regard to FIG. 3.

Figure 4:
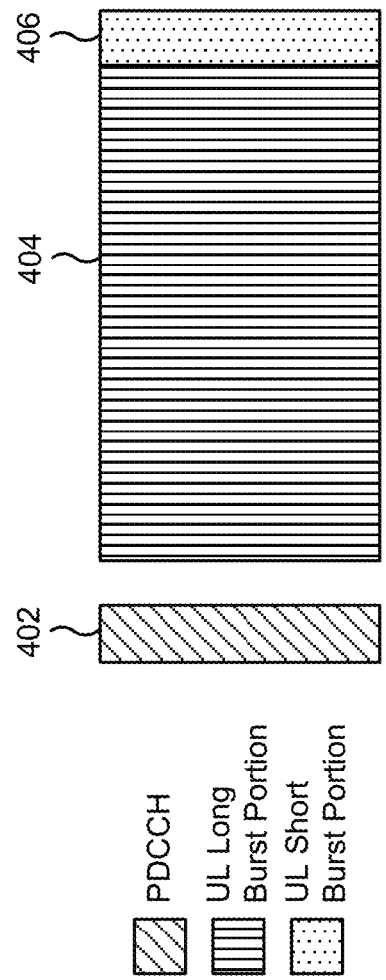
FIG. 4 is a diagram illustrating an example of an uplink (UL)-centric slot, in accordance with various aspects of the present disclosure.

FIG. 4 is a diagram 400 showing an example of an UL-centric slot or wireless communication structure. The UL-centric slot may include a control portion 402. The control portion 402 may exist in the initial or beginning portion of the UL-centric slot. The control portion 402 in FIG. 4 may be similar to the control portion 302 described above with reference to FIG. 3. The UL-centric slot may also include an UL long burst portion 404. The UL long burst portion 404 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 402 may be a physical DL control channel (PDCCH).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 406. The UL short burst portion 406 in FIG. 4 may be similar to the UL short burst portion 306 described above with reference to FIG. 3, and may include any of the information described above in connection with FIG. 3. The foregoing is one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 4 is provided as an example. Other examples may differ from what is described with regard to FIG. 4.

In a wireless communication system, such as an NR system, a downlink control information (DCI) communication may include control information, such as information associated with resource allocation (e.g., a set of resources to be used for a downlink shared channel, a set of resources to be used for an uplink shared channel, and/or the like), a transport format, and/or one or more other items of control information. Such a DCI communication is carried in a physical downlink control channel (PDCCH), which is communicated in one or more control resource sets (CORE-SETs).

A UE (e.g., UE 120) may be configured to monitor a PDCCH so that the UE can detect a DCI communication intended for the UE. In a typical communication scenario, the UE performs a blind search for a DCI communication in every slot (e.g., by attempting to decode the PDCCH in one or more CORESETs). However, this so-called blind decoding results in high power consumption at the UE. For example, in the typical communication scenario described above, over 40% of total UE power may be consumed by the UE monitoring the PDCCH without any scheduling grant.

The power consumption issue persists even in scenarios in which it is not obvious that a UE would need to frequently monitor for DCI communications, such as when the UE is configured with semi-persistent scheduling (SPS) or a configured grant. For example, the UE may need to monitor for a DCI communication in association with activating the SPS/configured grant. As another example, the UE configured with the SPS/configured grant may need to monitor for a DCI communication after a beam quality issue causes the UE to fail to receive a downlink communication (e.g., a physical downlink shared channel (PDSCH) communication). Here, after failing to receive (e.g., failing to decode) the downlink communication, the UE may transmit a negative acknowledgment (NACK) indicating the beam quality issue. After transmitting the NACK, the UE may monitor (within one or more CORESETs) for a DCI communication associated with initiating a beam sweep for beam re-selection/adaptation and re-transmission of downlink communication. This issue is particularly prevalent when operating in a high frequency range, such as Frequency Range 2 (FR2), because beam quality issues are more likely in high frequency ranges. Thus, monitoring for DCI communications can result in wasted UE power even where it is not obvious that a UE would need to frequently monitor for DCI communications.

One technique for resolving the power consumption issue caused by monitoring for DCI communications is to allow a base station to signal a location of a PDCCH that may carry DCI communications for a given UE (herein referred to as a PDCCH monitoring location). According to this technique, the PDCCH monitoring location is valid for a particular number of slots, after which the signaled PDCCH monitoring location expires. Here, content of DCI communications in terms of resource block allocation can differ among occurrences of the signaled PDCCH monitoring location, and a beam used for the DCI communications may differ across the occurrences of the signaled PDCCH monitoring location. However, this technique restricts flexibility in association with receiving and transmitting DCI communications. For example, from the UE perspective, the lack of flexibility means that the UE must always search the same PDCCH monitoring location on the same part of the bandwidth (e.g., even if the UE is using another part of the bandwidth for transmitting or receiving other communications). As another example, from the base station perspective, the base station must reserve resources of the signaled PDCCH monitoring occasion for the period of time during which the signaled PDCCH monitoring occasion is valid, which may reduce resource utilization and/or usage efficiency.

Some aspects herein provide techniques and apparatuses for dynamic indication of a PDCCH monitoring location. In some aspects, a base station may transmit, and a UE may receive, an indication identifying a PDCCH monitoring location associated with a next DCI communication. In some aspects, the indication may be valid at least until the PDCCH monitoring location, irrespective of an amount of time between receiving the indication and monitoring in the PDCCH monitoring location.

Figure 5A:
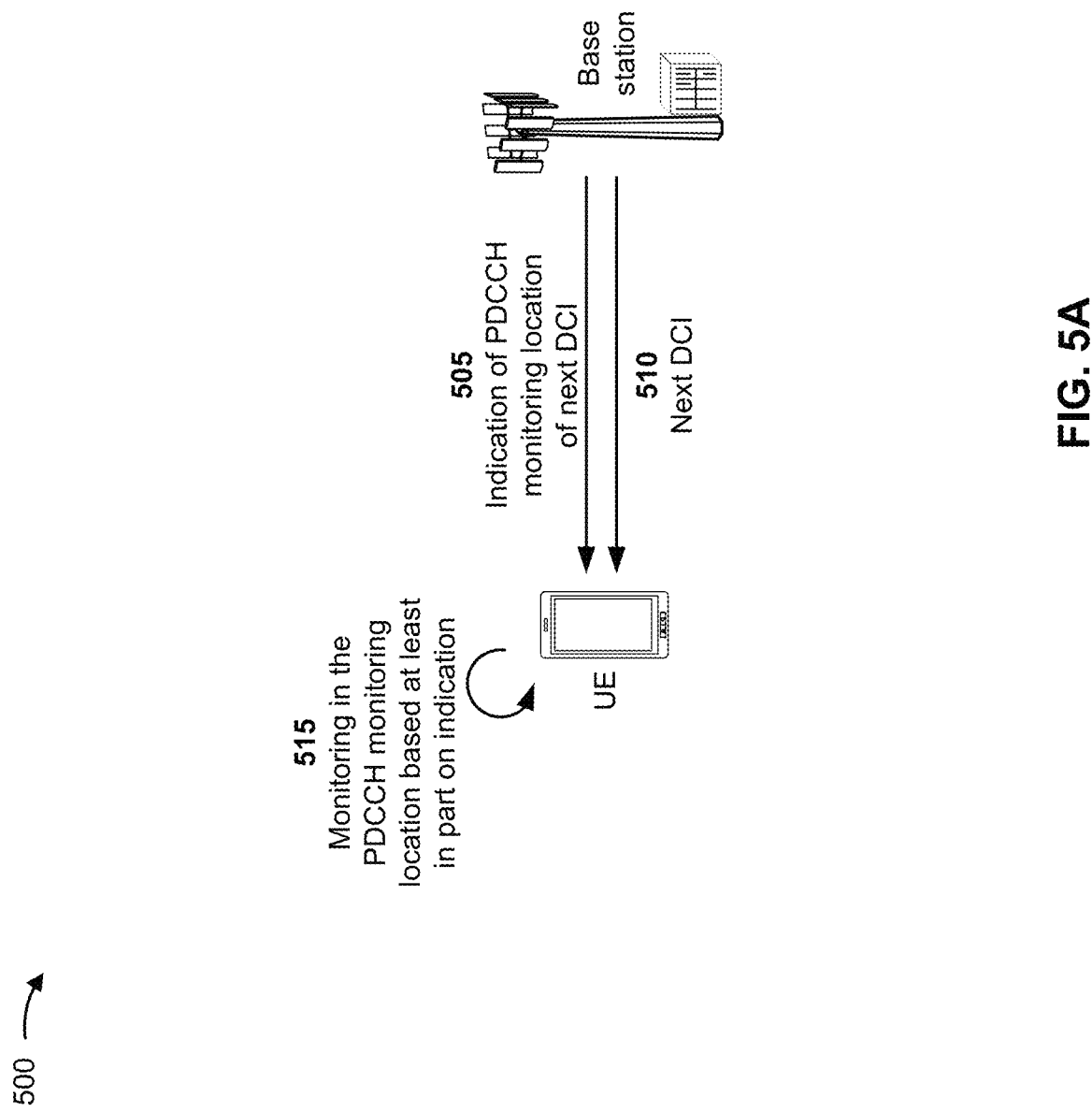
FIGS. 5A-5C are diagrams illustrating examples of dynamic indication of a PDCCH monitoring location, in accordance with various aspects of the present disclosure.
Figure 5B:
Figure 5C:
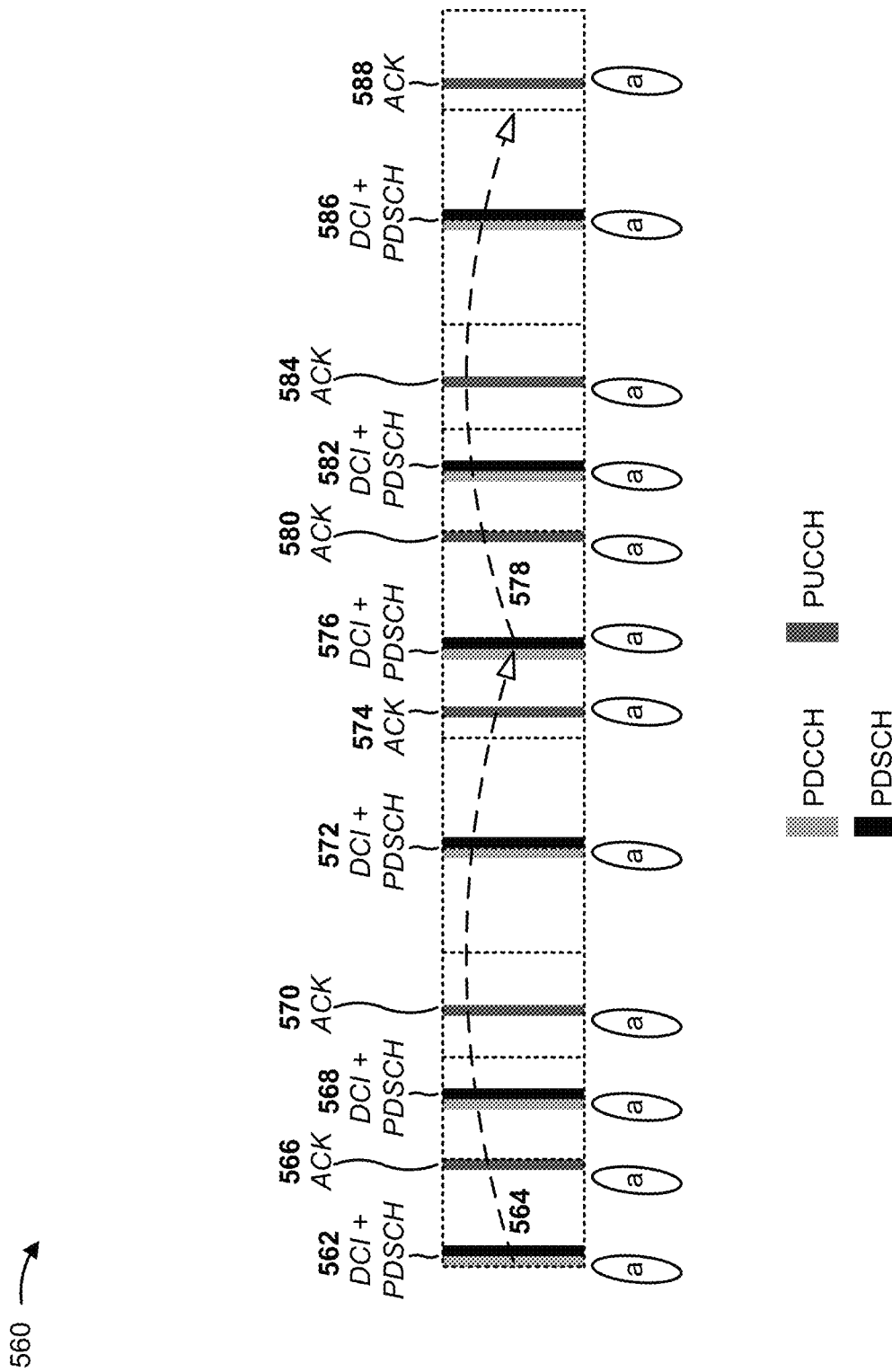

FIGS. 5A, 5B, and 5C are diagrams illustrating examples 500, 520, and 560, respectively, of dynamic indication of a PDCCH monitoring location, in accordance with various aspects of the present disclosure.

As shown in FIG. 5A by reference 505, a base station (e.g., base station 110) may transmit, to a UE (e.g., UE 120), an indication identifying a PDCCH monitoring location associated with a next DCI communication. In other words, the base station may transmit an indication identifying a PDCCH monitoring location to be monitored by the UE in association with receiving a next DCI communication. In some aspects, the indication is valid at least until the PDCCH monitoring location, irrespective of an amount of time between a time of the indication and a time of the PDCCH monitoring location. In other words, validity of the indicated PDCCH monitoring location is not defined by a particular period of time (i.e., the indicated PDCCH monitoring location does not expire after a particular period of time). Rather, the indication may be valid at least until a next occurrence of the PDCCH monitoring location.

In some aspects, the indication identifying the PDCCH monitoring location may include one or more parameters that define the PDCCH monitoring location. For example, the indication may include information that identifies a location of the PDCCH monitoring in the frequency domain and/or information that identifies a location of the PDCCH monitoring location in the time domain. As another example, the indication may include information that identifies a search space within which the PDCCH monitoring location is located. As another example, the indication may include information that identifies a CORESET within which the PDCCH monitoring location is located (e.g., where the identified CORESET may correspond to a new or different CORESET, as will be discussed in more detail below). As another example, the indication may include information that identifies a periodicity and/or an offset that defines the PDCCH monitoring location. As another example, the indication may include information that identifies a duration of the PDCCH monitoring location. As another example, the indication may include information that identifies a number of symbols associated with the PDCCH monitoring location (e.g., a number of symbols to be monitored). As another example, the indication may include information that identifies a number of PDCCH candidates.

In some aspects, the indication identifying the PDCCH monitoring location may be associated with at least one subsequent DCI communication after the next DCI communication. That is, in some aspects, the indication may identify multiple PDCCH monitoring locations, each associated with a respective one of multiple next DCI communications. Put generally, the indication may identify N (N≥1) PDCCH monitoring locations, each associated with a respective one of a next N DCI communications.

In some aspects, the base station may transmit the indication in a DCI communication (e.g., in a DCI communication transmitted in a previously indicated PDCCH monitoring location). In some aspects, the base station may transmit the indication via radio resource control (RRC) signaling. In some aspects, the base station may transmit the indication in a medium access control (MAC) control element (CE). In such a case, the MAC CE may identify a single logical channel identifier and a single PDCCH monitoring location, or may identify a plurality of logical channel identifiers and a corresponding plurality of PDCCH monitoring locations.

As further indicated by reference 505, the UE may receive the indication identifying the PDCCH monitoring location. Example operations in a scenario in which the UE receives the indication are described below, followed by example operations in a scenario in which the UE does not receive the indication.

In some aspects, the UE may receive the indication in a DCI communication, via RRC signaling, or in a MAC CE, as indicated above.

In some aspects, the UE may transmit an acknowledgment (ACK) indicating that the indication was received. As an example, if the indication is carried in a DCI communication, and the DCI communication is transmitted along with a PDSCH communication, the UE may attempt to decode the DCI communication and the PDSCH communication. Here, if the UE successfully decodes the DCI communication and the PDSCH communication, then the UE may transmit (e.g., in a PUCCH) an ACK indicating that the UE has received the indication and the PDSCH communication. Conversely, in some aspects, the UE may transmit a negative ACK (NACK) indicating that the indication was received. As an example, if the indication is carried in a DCI communication, and the DCI communication is transmitted along with a PDSCH communication, the UE may attempt to decode the DCI communication and the PDSCH communication. Here, if the UE successfully decodes the DCI communication but does not successfully decode the PDSCH communication, then the UE may transmit (e.g., in a PUCCH) a NACK indicating that the UE has received the indication, but not the PDSCH communication. Therefore, in some aspects, the base station may receive an ACK or a NACK indicating that the indication was received by the UE.

As shown by reference 510, the base station may transmit the next DCI communication after transmitting the indication. In some aspects, the base station may transmit the next DCI communication in the indicated PDCCH monitoring location. For example, as described above, the UE may receive the indication and may transmit, to the base station, an ACK or a NACK indicating that the UE received the indication. Here, the base station may transmit the next DCI communication in the PDCCH monitoring location based at least in part on the ACK or the NACK indicating that the indication was received.

As shown by reference 515, in some aspects, the UE may monitor in the PDCCH monitoring location based at least in part on the indication. For example, after receiving the indication, the UE may monitor in the identified PDCCH monitoring location in association with receiving the next DCI communication.

In some aspects, the UE may receive the next DCI communication based at least in part on monitoring in the PDCCH monitoring location. In some aspects, the next DCI communication may include another indication identifying another PDCCH monitoring location associated with transmitting a subsequent DCI communication. That is, the base station may indicate another PDCCH monitoring location associated with a subsequent DCI communication to be received by the UE (e.g., a DCI communication that is to follow the previously transmitted/received next DCI communication). Here, the UE may monitor in the other PDCCH monitoring location based at least in part on the other indication. In this way, indication of PDCCH monitoring locations may be repeated over time, which allows PDCCH monitoring locations to be dynamically indicated to the UE, thereby providing flexibility in terms of PDCCH monitoring locations, while also reducing power consumption at the UE.

In some aspects, the UE may transmit an ACK or a NACK indicating that the next DCI communication was received. As an example, the next DCI communication may be transmitted along with a PDSCH communication, the UE may attempt to decode the next DCI communication and the PDSCH communication. Here, if the UE successfully decodes the next DCI communication and the PDSCH communication, then the UE may transmit (e.g., in a PUCCH) an ACK indicating that the UE has received the next DCI communication and the PDSCH communication. Conversely, if the UE successfully decodes the next DCI communication but does not successfully decode the PDSCH communication, then the UE may transmit (e.g., in a PUCCH) a NACK indicating that the UE has received the next DCI communication, but not the PDSCH communication. Therefore, in some aspects, the base station may receive an ACK or a NACK indicating that the next DCI communication was received by the UE.

In some aspects, the UE may fail to receive the next DCI communication based at least in part on monitoring in the PDCCH monitoring location, and may transmit a NACK indicating that the next DCI communication was not received. For example, if the UE does not successfully decode the next DCI communication, then the UE may transmit (e.g., in a PUCCH) a NACK indicating that the UE has failed to receive the next DCI communication. Therefore, in some aspects, the base station may receive a NACK indicating that the next DCI communication was not received by the UE.

In some aspects, based at least in part on failing to receive the next DCI communication, the UE may monitor in the PDCCH monitoring location in association with receiving a subsequent DCI communication (e.g., a DCI communication that follows the next DCI communication). For example, upon failing to receive the next DCI communication, the UE may transmit a NACK indicating that the next DCI communication was not received. Here, the UE may be configured to monitor in the previously indicated PDCCH monitoring location (e.g., the same PDCCH monitoring location as that monitored for the next DCI communication that was not received by the UE). In some aspects, the base station may be configured to transmit the subsequent DCI communication in the PDCCH monitoring location based at least in part on receiving the NACK indicating that the next DCI communication was not received. Put another way, in some aspects, when the UE does not receive the next DCI communication, the previously indicated PDCCH monitoring location may be reused for a subsequent DCI communication.

In some aspects, based at least in part on failing to receive the next DCI communication, the UE may monitor a plurality of PDCCH monitoring locations in association with receiving a subsequent DCI communication (e.g., a DCI communication that follows the next DCI communication). For example, upon failing to receive the next DCI communication, the UE may transmit a NACK indicating that the next DCI communication was not received. Here, the UE may be configured to monitor a plurality of PDCCH monitoring locations (e.g., a plurality of PDCCH monitoring locations, configured for the UE, that are candidates for carrying a PDCCH for the UE). In some aspects, the base station may be configured to transmit the subsequent DCI communication in one of the plurality of PDCCH monitoring locations based at least in part on receiving the NACK indicating that the next DCI communication was not received.

In some aspects, the base station may receive no indication of whether the next DCI communication was received. This may be the case when, for example, the UE does not transmit an ACK or a NACK, or when an ACK or NACK transmitted by the UE is not received by the base station (e.g., due to a beam quality issue). In some aspects, the base station may be configured to transmit the subsequent DCI communication in the PDCCH monitoring location based at least in part on receiving no indication of whether the next DCI communication was received. Put another way, in some aspects, when the base station does not receive any indication of whether the UE has received the next DCI communication, the previously indicated PDCCH monitoring location may be reused for a subsequent DCI communication. Alternatively, the base station may be configured to transmit the subsequent DCI in one of a plurality of PDCCH monitoring locations based at least in part on receiving no indication of whether the next DCI communication was received.

FIG. 5B illustrates a diagram of an example sequence of operations associated with dynamic indications of PDCCH monitoring locations.

As indicated by reference 522, a base station transmits, to a UE and using a first beam (identified in FIG. 5B as "a"), a first DCI communication and a first PDSCH communication. As indicated by reference 524, the first DCI communication includes an indication of a PDCCH monitoring location associated with a second DCI communication (i.e., a next DCI communication associated with the UE). As indicated by reference 526, the UE receives the first DCI communication and the first PDSCH communication, and transmits, to the base station, an ACK indicating that the first DCI communication and the first PDSCH communication were received by the UE.

As indicated by reference 528, the base station transmits, to the UE and using the first beam, the second DCI communication and a second PDSCH communication. Here, the base station transmits the second DCI communication in the PDCCH monitoring location indicated by the first DCI communication. The UE monitors the PDCCH monitoring location indicated by the first DCI communication, and receives the second DCI communication accordingly. As indicated by reference 530, the second DCI communication includes an indication of a PDCCH monitoring location associated with a third DCI communication (i.e., a next DCI communication associated with the UE). Here, the UE also receives the second PDSCH communication. Next, as shown by reference 532, the UE transmits, to the base station, an ACK indicating that the second DCI communication and the second PDSCH communication were received by the UE.

As indicated by reference 534, the base station transmits, to the UE and using the first beam, the third DCI communication and a third PDSCH communication. Here, the base station transmits the third communication in the PDCCH monitoring location indicated by the second DCI communication. The UE monitors the PDCCH monitoring location indicated by the second DCI communication, and receives the second DCI communication accordingly. As indicated by reference 536, the third DCI communication includes an indication of a PDCCH monitoring location associated with a fourth DCI communication (i.e., a next DCI communication associated with the UE). However, in this example, as indicated by reference 537, while the UE receives the third DCI communication, the UE does not receive (e.g., fails to decode) the third PDSCH communication. In this example, the failure to receive the third PDSCH is caused by a beam quality issue. Therefore, as indicated by reference 538, the UE transmits, to the base station, a NACK indicating that the third DCI communication was received and that the third PDSCH communication was not received due to the beam quality issue.

As shown by reference 540, based at least in part on the NACK, the base station and the UE perform a beam re-selection procedure. For example, the base station transmits channel state information reference signals (CSI-RSs) on a set of beams (e.g., including a second beam identified as "b", a third beam identified as "c", a fourth beam identified as "d", and a fifth beam identified as "e"). The UE receives the CSI-RSs and provides PUCCH communications, associated with each beam of the set of beams, in association with identifying a suitable beam to be used for further communications with the base station. In this example, the fourth beam is selected as a suitable beam.

After the beam re-selection, as indicated by reference 542, the base station transmits, to the UE and using the fourth beam, the fourth DCI communication and a fourth PDSCH communication (e.g., a retransmission of the third PDSCH). Here, the base station transmits the fourth DCI communication in the PDCCH monitoring location indicated by the third DCI communication. The UE monitors the PDCCH monitoring location indicated by the third DCI communication, and receives the fourth DCI communication accordingly. As indicated by reference 544, the fourth DCI communication includes an indication of a PDCCH monitoring location associated with a fifth DCI communication (i.e., a next DCI communication associated with the UE). Notably, the indication of the PDCCH monitoring location included in the third DCI communication is still valid for receiving the fourth DCI communication, even though the beam re-selection procedure was performed between the NACK and the transmission of the fourth DCI communication. In other words, the indication in the third DCI communication is valid at least until the indicated PDCCH monitoring location irrespective of an amount of time (or performance of other operations) between the indication and the indicated PDCCH monitoring location. Here, the UE also receives the fourth PDSCH communication. Therefore, as shown by reference 546, the UE transmits, to the base station, an ACK indicating that the fourth DCI communication and the fourth PDSCH communication were received by the UE.

As shown by reference 548, after the UE transmits the ACK, the UE transmits sounding reference signals (SRSs) for the set of beams based on which beam re-selection was performed. As indicated by reference 550, after transmission of the SRSs, the base station transmits, to the UE and using the fourth beam, the fifth DCI communication and a fifth PDSCH communication. Here, the base station transmits the fifth DCI communication in the PDCCH monitoring location indicated by the fourth DCI communication. The UE monitors the PDCCH monitoring location indicated by the fourth DCI communication, and receives the fifth DCI communication accordingly. As indicated by reference 552, the fifth DCI communication includes an indication of a PDCCH monitoring location associated with a sixth DCI communication (i.e., a next DCI communication associated with the UE (not shown)). Notably, the indication of the PDCCH monitoring location included in the fourth DCI communication is still valid for receiving the fifth DCI communication, even though the UE transmitted the SRSs between the previous ACK and the base station transmission of the fifth DCI communication. In other words, the indication in the fourth DCI communication is valid at least until the indicated PDCCH monitoring location, irrespective of an amount of time (or performance of other operations) between the indication and the indicated PDCCH monitoring location. Here, the UE also receives the fifth PDSCH communication. Next, as shown by reference 554, the UE transmits, to the base station, an ACK indicating that the fifth DCI communication and the fifth PDSCH communication were received. Further operations of the base station and the UE may continue in a similar manner.

In some aspects, the indication identifying the PDCCH monitoring location may be valid for a particular period of time. For example, the indication identifying the PDCCH monitoring location may be valid for a particular number of slots, a particular number of milliseconds, or the like. In such a case, the PDCCH monitoring location identified by the indication may be the same for all DCI communications arriving with the particular period of time.

FIG. 5C illustrates a diagram of another example sequence of operations associated with dynamic indications of PDCCH monitoring locations.

As indicated by reference 562, a base station transmits, to a UE and using a first beam (identified in FIG. 5C as "a"), a first DCI communication and a first PDSCH communication. As indicated by reference 564, the first DCI communication includes an indication of a PDCCH monitoring location. Here, as indicated by the dashed arrow associated with reference 564, the PDCCH monitoring location is valid for a particular period of time—six slots. That is, in the next six slots, the PDCCH monitoring location identified in the indication is to be used by the UE in association with receiving DCI communications. As indicated by reference 566, the UE receives the first DCI communication and the first PDSCH communication, and transmits, to the base station, an ACK indicating that the first DCI communication and the first PDSCH communication were received by the UE.

As indicated by reference 568, the base station transmits, to the UE and using the first beam, a second DCI communication and a second PDSCH communication. Here, the base station transmits the second DCI communication in the PDCCH monitoring location indicated by the first DCI communication (e.g., the indication is still valid since the second DCI communication is being transmitted in a second slot since the indication). The UE monitors the PDCCH monitoring location indicated by the first DCI communication, and receives the second DCI communication and the second PDSCH communication accordingly. Next, as shown by reference 570, the UE transmits, to the base station, an ACK indicating that the second DCI communication and the second PDSCH communication were received by the UE.

As indicated by reference 572, the base station transmits, to the UE and using the first beam, a third DCI communication and a third PDSCH communication. Here, the base station transmits the third DCI communication in the PDCCH monitoring location indicated by the first DCI communication (e.g., the indication is still valid since the third DCI communication is being transmitted in a fifth slot since the indication). The UE monitors the PDCCH monitoring location indicated by the first DCI communication, and receives the third DCI communication and the third PDSCH communication accordingly. Next, as shown by reference 574, the UE transmits, to the base station, an ACK indicating that the third DCI communication and the third PDSCH communication were received by the UE.

As indicated by reference 576, the base station transmits, to the UE and using the first beam, a fourth DCI communication and a fourth PDSCH communication. Here, the base station transmits the fourth DCI communication in the PDCCH monitoring location indicated by the first DCI communication (e.g., the indication is still valid since the fourth DCI communication is being transmitted in a sixth slot since the indication). As indicated by reference 578, the fourth DCI communication includes an indication of another PDCCH monitoring location. Here, as indicated by the dashed arrow associated with reference 578, the PDCCH monitoring location is valid for a next five slots. That is, in the next five slots, the PDCCH monitoring location identified in the other indication is to be used by the UE in association with receiving DCI communications. As indicated by reference 580, the UE receives the fourth DCI communication and the fourth PDSCH communication, and transmits, to the base station, an ACK indicating that the fourth DCI communication and the fourth PDSCH communication were received by the UE.

As indicated by reference 582, the base station transmits, to the UE and using the first beam, a fifth DCI communication and a fifth PDSCH communication. Here, the base station transmits the fifth DCI communication in the PDCCH monitoring location indicated by the fourth DCI communication (e.g., the indication is still valid since the fourth DCI communication is being transmitted in a second slot since the indication). The UE monitors the PDCCH monitoring location indicated by the fourth DCI communication, and receives the fifth DCI communication and the fifth PDSCH communication accordingly. Next, as shown by reference 584, the UE transmits, to the base station, an ACK indicating that the fifth DCI communication and the fifth PDSCH communication were received by the UE.

As indicated by reference 586, the base station transmits, to the UE and using the first beam, a sixth DCI communication and a sixth PDSCH communication. Here, the base station transmits the sixth DCI communication in the PDCCH monitoring location indicated by the fourth DCI communication (e.g., the indication is still valid since the sixth DCI communication is being transmitted in a fourth slot since the indication). The UE monitors the PDCCH monitoring location indicated by the fourth DCI communication, and receives the sixth DCI communication and the sixth PDSCH communication accordingly. Next, as shown by reference 588, the UE transmits, to the base station, an ACK indicating that the sixth DCI communication and the sixth PDSCH communication were received by the UE.

As indicated above, FIGS. 5A-5C are provided as examples. Other examples may differ from what is described with respect to FIGS. 5A-5C.

FIG. 6 is a diagram illustrating an example process 600 performed, for example, by UE, in accordance with various aspects of the present disclosure. Example process 600 is an example where the UE (e.g., UE 120 and/or the like) performs operations associated with dynamic indication of a PDCCH monitoring location.

As shown in FIG. 6, in some aspects, process 600 may include receiving an indication identifying a PDCCH monitoring location associated with receiving a next DCI communication (block 610). For example, the UE (e.g., using receive processor 258, controller/processor 280, memory 282, and/or the like) may receive an indication identifying a PDCCH monitoring location associated with receiving a next DCI communication, as described above.

As further shown in FIG. 6, in some aspects, process 600 may include monitoring in the PDCCH monitoring location based at least in part on the indication, wherein the indication is valid at least until the PDCCH monitoring location irrespective of an amount of time between receiving the indication and monitoring in the PDCCH monitoring location (block 620). For example, the UE (e.g., using receive processor 258, controller/processor 280, memory 282, and/or the like) may monitor in the PDCCH monitoring location based at least in part on the indication, as described above. In some aspects, the indication is valid at least until the PDCCH monitoring location irrespective of an amount of time between receiving the indication and monitoring in the PDCCH monitoring location.

Process 600 may include additional aspects, such as any single aspect or any combination of aspects described below and/or in connection with one or more other processes described elsewhere herein.

In a first aspect, the indication identifying the PDCCH monitoring location includes information associated with at least one of a frequency domain location, a time domain location, a search space identifier, a CORESET identifier, a periodicity, an offset, a duration, a number of symbols to be monitored, or a number of PDCCH candidates.

In a second aspect, alone or in combination with the first aspect, the indication identifying the PDCCH monitoring location is further associated with receiving at least one subsequent DCI communication after the next DCI communication.

In a third aspect, alone or in combination with one or more of the first and second aspects, the indication is received in DCI.

In a fourth aspect, alone or in combination with one or more of the first through third aspects, the indication is received via RRC signaling.

In a fifth aspect, alone or in combination with one or more of the first through fourth aspects, the indication is received in a MAC CE.

In a sixth aspect, in combination with the fifth aspect, the MAC CE identifies a single logical channel identifier and a single PDCCH monitoring location.

In a seventh aspect, in combination with the fifth aspect, the MAC CE identifies a plurality of logical channel identifiers and a corresponding plurality of PDCCH monitoring locations.

In an eighth aspect, alone or in combination with one or more of the first through seventh aspects, process 600 includes transmitting an ACK or a NACK indicating that the indication was received.

In a ninth aspect, alone or in combination with one or more of the first through eighth aspects, process 600 includes receiving the next DCI communication based at least in part on monitoring in the PDCCH monitoring location, wherein the next DCI communication includes another indication identifying another PDCCH monitoring location associated with receiving a subsequent DCI communication; and monitoring in the other PDCCH monitoring location based at least in part on the other indication.

In a tenth aspect, alone or in combination with one or more of the first through ninth aspects, process 600 includes receiving the next DCI communication based at least in part on monitoring in the PDCCH monitoring location; and transmitting an ACK or a NACK indicating that the next DCI communication was received.

In an eleventh aspect, alone or in combination with one or more of the first through tenth aspects, process 600 includes failing to receive the next DCI communication based at least in part on monitoring in the PDCCH monitoring location; and transmitting a NACK indicating that the next DCI communication was not received.

In a twelfth aspect, in combination with the eleventh aspect, process 600 includes monitoring in the PDCCH monitoring location in association with receiving a subsequent DCI communication based at least in part on failing to receive the next DCI communication.

In a thirteenth aspect, alone or in combination with one or more of the eleventh and twelfth aspects, process 600 includes monitoring in a plurality of PDCCH monitoring locations in association with receiving a subsequent DCI communication based at least in part on failing to receive the next DCI communication.

In a fourteenth aspect, alone or in combination with one or more of the first through thirteenth aspects the indication identifying the PDCCH monitoring location is valid for a particular period of time.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
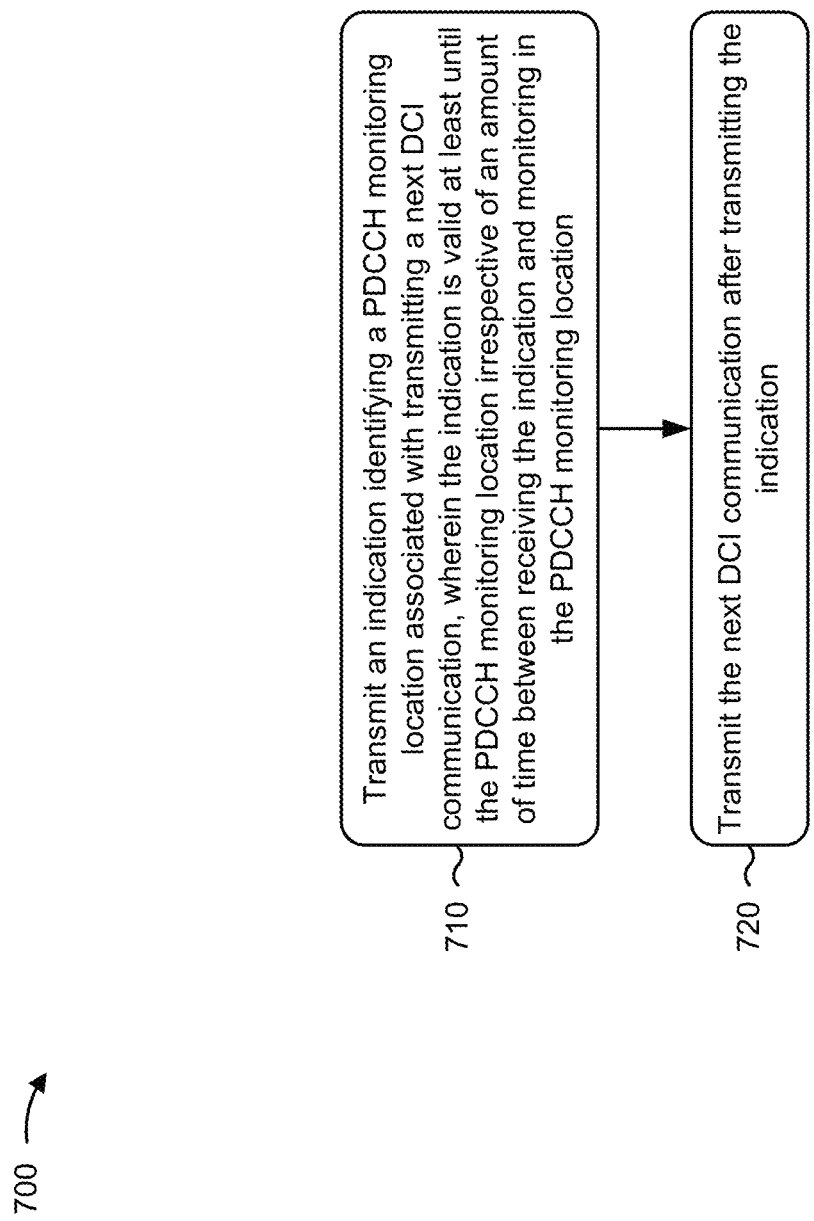
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where the base station (e.g., base station 110 and/or the like) performs operations associated with dynamic indication of a PDCCH monitoring location.

As shown in FIG. 7, in some aspects, process 700 may include transmitting an indication identifying a PDCCH monitoring location associated with transmitting a next DCI communication, wherein the indication is valid at least until the PDCCH monitoring location irrespective of an amount of time between receiving the indication and monitoring in the PDCCH monitoring location (block 710). For example, the base station (e.g., using transmit processor 220, controller/processor 240, memory 242, and/or the like) may transmit an indication identifying a PDCCH monitoring location associated with transmitting a next DCI communication, as described above. In some aspects, the indication is valid at least until the PDCCH monitoring location irrespective of an amount of time between receiving the indication and monitoring in the PDCCH monitoring location.

As further shown in FIG. 7, in some aspects, process 700 may include transmitting the next DCI communication after transmitting the indication (block 720). For example, the base station (e.g., using transmit processor 220, controller/processor 240, memory 242, and/or the like) may transmit the next DCI communication after transmitting the indication, as described above.

Process 700 may include additional aspects, such as any single aspect or any combination of aspects described below and/or in connection with one or more other processes described elsewhere herein.

In a first aspect, the indication identifying the PDCCH monitoring location includes information that identifies at least one of a frequency domain location, a time domain location, a search space identifier, a CORESET identifier, a periodicity, an offset, a duration, a number of symbols to be monitored, or a number of PDCCH candidates.

In a second aspect, alone or in combination with the first aspect, the indication identifying the PDCCH monitoring location is further associated with transmitting at least one subsequent DCI communication after the next DCI communication.

In a third aspect, alone or in combination with one or more of the first and second aspects, the indication is transmitted in DCI.

In a fourth aspect, alone or in combination with one or more of the first through third aspects, the indication is transmitted via RRC signaling.

In a fifth aspect, alone or in combination with one or more of the first through fourth aspects, the indication is transmitted in a MAC CE.

In a sixth aspect, in combination with the fifth aspect, the MAC CE identifies a single logical channel identifier and a single PDCCH monitoring location.

In a seventh aspect, in combination with the fifth aspect, the MAC CE identifies a plurality of logical channel identifiers and a corresponding plurality of PDCCH monitoring locations.

In an eighth aspect, alone or in combination with one or more of the first through seventh aspects, process 700 includes receiving an ACK or a NACK indicating that the indication was received.

In a ninth aspect, in combination with the eighth aspect, the next DCI communication is transmitted in the PDCCH monitoring location based at least in part on the ACK or the NACK indicating that the indication was received.

In a tenth aspect, alone or in combination with one or more of the first through ninth aspects, the next DCI communication includes another indication identifying another PDCCH monitoring location associated with transmitting a subsequent DCI communication.

In an eleventh aspect, alone or in combination with one or more of the first through tenth aspects, process 700 includes receiving an ACK or a NACK indicating that the next DCI communication was received.

In a twelfth aspect, alone or in combination with one or more of the first through eleventh aspects, process 700 includes receiving a NACK indicating that the next DCI communication was not received.

In a thirteenth aspect, in combination with the twelfth aspect, process 700 includes transmitting a subsequent DCI communication in the PDCCH monitoring location based at least in part on the NACK.

In a fourteenth aspect, in combination with the twelfth aspect, process 700 includes transmitting a subsequent DCI communication in one of a plurality of PDCCH monitoring locations based at least in part on the NACK.

In a fifteenth aspect, alone or in combination with one or more of the first through fourteenth aspects, process 700 includes receiving no indication of whether the next DCI communication was received; and transmitting a subsequent DCI in the PDCCH monitoring location based at least in part on receiving no indication of whether the next DCI communication was received.

In a sixteenth aspect, alone or in combination with one or more of the first through fifteenth aspects, process 700 includes receiving no indication of whether the next DCI communication was received; and transmitting a subsequent DCI in one of a plurality of PDCCH monitoring locations based at least in part on receiving no indication of whether the next DCI communication was received.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

While the embodiments described above with respect to FIGS. 5A-7 focus primarily upon various mechanisms and protocols associated with transmission of an indication of a PDDCH monitoring location, other aspects of the present disclosure relate to various triggering mechanisms for transmission of indications of PDDCH monitoring locations, as will be discussed below with respect to FIGS. 8-13. For example, selective triggering of requests for indications of PDDCH monitoring locations may facilitate reduced power consumption at the UE, less system interference and less system overhead.

Figure 8:
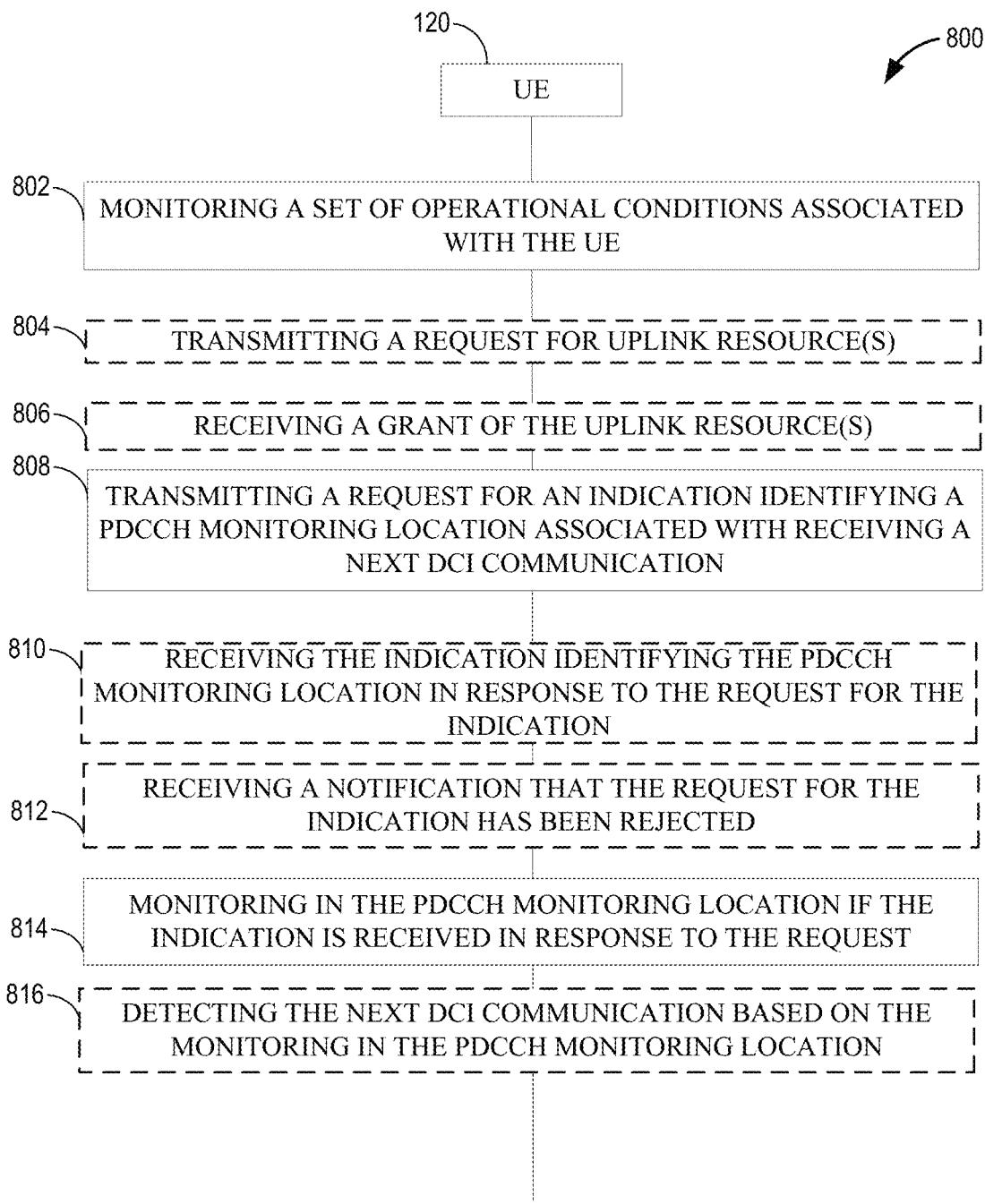
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with triggering a dynamic indication of a PDCCH monitoring location.

As shown in FIG. 8, in some aspects, process 800 may include monitoring a set of operational conditions associated with the UE (block 802). For example, the UE (e.g., using receive processor 258, controller/processor 280, memory 282, and/or the like) may monitor the set of operational conditions. In some designs, the set of operational conditions may include at least one operational condition associated with a channel (e.g., PUSCH) between the UE and a base station (e.g., whether SPS/configured grant is configured on the channel, an estimated traffic volume on the channel, a traffic pattern characteristic on the channel, an error rate on the channel, etc.). In some designs, the set of operational conditions may include at least one operational condition associated with a state of the UE (e.g., a power state of the UE, such as a battery charge level of the UE or a charging status of the UE).

As further shown in FIG. 8, in some aspects, process 800 may optionally include transmitting (e.g., via antenna(s) 252a . . . 252r, TX MIMO processor 266, modulators(s) 254a . . . 254r, TX processor 264) a request to the base station for uplink resource(s) (block 804). In an example, the request at block 804 may be triggered by the monitoring from block 802 in an example. For example, the monitoring of the set of operational conditions at block 802 may result in a determination by the UE to transmit a request for an indication identifying a PDCCH monitoring location associated with receiving a next DCI communication. In this case, the request for uplink resource(s) at block 804 may be performed if the UE does not already have sufficient uplink resource(s) for transmission of the request for the indication. In an example, the requested uplink resource(s) may be associated with a physical uplink control channel (PUCCH) or a medium access control (MAC) command element (CE).

As further shown in FIG. 8, in some aspects, process 800 may optionally include receiving (e.g., via antenna(s) 252a . . . 252r, demodulators(s) 254a . . . 254r, MIMO detector 256, RX processor 258) a grant of the uplink resource(s) (block 806). For example, the grant received at block 806 may be received in response to the request transmitted at block 804. As noted above, block 804 is optional, and if block 804 is not performed than block 806 may likewise not be performed. In an example, the granted uplink resource(s) may be associated with a PUCCH or a MAC CE.

As further shown in FIG. 8, in some aspects, process 800 may include transmitting (e.g., via antenna(s) 252a . . . 252r, TX MIMO processor 266, modulators(s) 254a . . . 254r, TX processor 264), based on the monitoring, a request for an indication identifying a PDCCH monitoring location associated with receiving a next DCI communication (block 808). In an example, the request of block 808 may be transported using the uplink resource(s) associated with the grant from optional block 806. Alternatively, the request of block 808 may be transported using other uplink resource(s). The monitoring of block 802 triggers the transmission of block 808 may occur in a variety of ways, as will be discussed below in more detail.

As further shown in FIG. 8, in some aspects, process 800 may optionally include receiving (e.g., antenna(s) 252a . . . 252r, demodulators(s) 254a . . . 254r, MIMO detector 256, RX processor 258) the indication identifying the PDCCH monitoring location in response to the request (block 810). In an example, receipt of the indication at block 810 may be optional for various reasons, such as the transmission of block 808 failing to reach the base station, or alternatively the base station may receive the transmission of block 808 and then decide to reject the UE's request for the indication identifying the PDCCH monitoring location. In some designs, the indication of block 810 may be received via a DCI communication or a MAC CE. In an example, the identified PDCCH monitoring location may be associated with a CORESET change. In this case, the request from block 808 may be characterized as a CORESET change request.

As further shown in FIG. 8, in some aspects, process 800 may optionally include receiving (e.g., antenna(s) 252a . . . 252r, demodulators(s) 254a . . . 254r, MIMO detector 256, RX processor 258), from the base station, a notification that the UE's request for the indication identifying the PDCCH monitoring location has been rejected (block 812). There are various reasons that may cause the base station to reject the UE's request for the indication identifying the PDCCH monitoring location (e.g., various network criteria such as loading, etc.), as will be discussed below in more detail. In other designs, the base station may reject the UE's request for the indication identifying the PDCCH monitoring location without sending any notification to the UE. In such systems, the UE may either interpret the lack of the indication as an implicit rejection of the request, or alternatively may re-transmit the request of block 808 to the base station.

As further shown in FIG. 8, in some aspects, process 800 may include monitoring (e.g., antenna(s) 252a . . . 252r, demodulators(s) 254a . . . 254r, MIMO detector 256, RX processor 258) in the PDCCH monitoring location if the indication is received in response to the request (block 814). In some designs, if the indication identifying the PDCCH monitoring location is received pursuant to block 810, then the monitoring in the PDCCH monitoring location is performed at block 814. In some designs, if the indication identifying the PDCCH monitoring location is not received (or is outright rejected as in block 812), then the monitoring in the PDCCH monitoring location is not performed at block 814.

As further shown in FIG. 8, in some aspects, process 800 may include optionally detecting (e.g., antenna(s) 252a . . . 252r, demodulators(s) 254a . . . 254r, MIMO detector 256, RX processor 258) the next DCI communication based on the monitoring in the PDCCH monitoring location (block 816). The detection of block 814 is optional for various reasons (e.g., despite the indication, the base station may not transmit the DCI communication in the PDCCH monitoring location, or the indication may not have been received based on a rejection or for some other reason, etc.).

Process 800 may include additional aspects, such as any single aspect or any combination of aspects described below and/or in connection with one or more other processes described elsewhere herein.

In a first aspect, at least one of the set of operational conditions monitored at block 802 is associated with a channel between the UE and a base station. In some designs, the channel may comprise a physical uplink shared channel (PUSCH) that includes one or more uplink resources allocated to the UE.

In a first example of the first aspect, the set of operational conditions may include whether the channel includes one or more uplink resources that are allocated to the UE in accordance with a SPS or configured grant (CG) protocol. For example, the transmission of the request at block 808 may be triggered if the one or more uplink resources are not allocated with the SPS or CG protocol.

In a second example of the first aspect, the set of operational conditions may include an estimated traffic volume of the UE on one or more uplink resources of the channel include. For example, the transmission of the request at block 808 may be triggered if the estimated traffic volume exceeds a traffic volume threshold.

In a third example of the first aspect, the set of operational conditions may include a traffic pattern characteristic on by the UE on one or more uplink resources of the channel. For example, the transmission of the request at block 808 may be triggered if the traffic pattern characteristic on the channel is associated with aperiodic traffic, periodic traffic at an interval that exceeds an interval threshold, or a combination thereof In a fourth example of the first aspect, the set of operational conditions may include an error rate on the channel. For example, the error rate may correspond to a block error rate (BLER). For example, the transmission of the request at block 808 may be triggered if the error rate on the channel is below an error rate threshold (e.g., 0.01%).

In a second aspect, at least one of the set of operational conditions monitored at block 802 is associated with a state of the UE. In some designs, the state of the UE may comprise a power state of the UE. For example, if the power state of the UE is indicative of a low power condition, the UE may benefit from skipping decoding of the PDCCH altogether in some cases. In an example, the power state of the UE may a battery charge level of the UE, a charging status of the UE, or a combination thereof. In an example, the transmission of the request at block 808 may be triggered if the battery charge level of the UE is higher than a charge threshold, if the charging status of the UE indicates that the UE is charging, or a combination thereof. Conversely, in other designs, the transmission of the request at block 808 may be triggered if the battery charge level of the UE is less than a charge threshold, if the charging status of the UE indicates that the UE is not charging, or a combination thereof.

In a third aspect, the set of operational conditions may comprise various combinations of the exemplary operational conditions in some designs (e.g., trigger request for indication of PDCCH monitoring location based if there is no SPS/CG configuration for PUSCH, estimated traffic volume on PUSCH is above traffic volume threshold, the UE is not charging and its battery charge level is low).

In a fourth aspect, in some designs, the request transmitted at block 808 may not convey a reason for the transmission (e.g., the monitored operational condition(s) which prompted the transmission). However, in other designs, the request transmitted at block 808 may include some information that is based on the monitoring from block 802. For example, if a particular monitored operational condition is what triggered the request transmitted at block 808, then information associated with that particular monitored operational condition may be sent with the request (e.g., in the same message or a different message). If one or more monitored operational conditions did not contribute to the decision at the UE to trigger the request transmitted at block 808, information associated with those non-contributing monitored operational condition(s) need not be sent to the base station in some designs. As will be discussed below in more detail, in some designs, the base station may optionally factor at least some part of the information that is based on the monitoring from block 802 in its decision as to whether to grant or reject the request transmitted at block 808.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
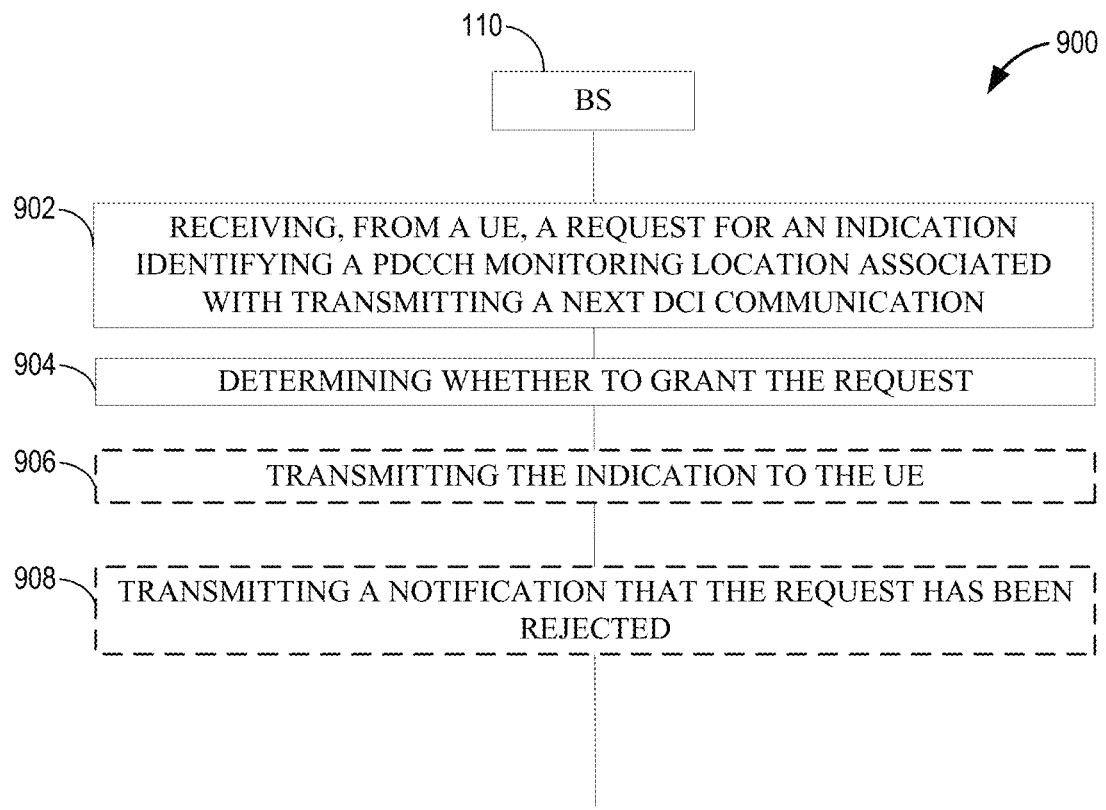
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. Example process 900 is an example where the base station (e.g., base station 110 and/or the like) performs operations associated with triggering a dynamic indication of a PDCCH monitoring location.

As shown in FIG. 9, in some aspects, process 900 may include receiving (e.g., via antenna(s) 234*a* . . . 234*r*, demodulators(s) 232*a* . . . 232*r*, RX MIMO processor 236, RX processor 238), from a UE a request for an indication identifying a PDCCH monitoring location associated with transmitting a next DCI communication (block 902). For example, block 902 may result from the transmission of block 808 of FIG. 8. In some designs, the request at block 902 may be transported over a PUCCH or a MAC CE.

As further shown in FIG. 9, in some aspects, process 900 may include determining (e.g., via controller/processor 240) whether to grant the request (block 904). In an example, the determination of block 904 may be based at least in part upon one or more network criteria (e.g., a current loading condition of the base station, operator policy, UE permissions, etc.). For example, a particular UE (e.g., a low priority UE) may not have sufficient permission to request PDCCH monitoring locations, in which requests from such UEs are auto-rejected. Conversely, another UE (e.g., a high priority UE) may have sufficient permission to request PDCCH monitoring locations, in which requests from such UEs are auto-accepted. In another example, a current loading condition of the base station may be compared with a loading threshold, and the request at block 904 may be granted if the current loading condition is below the loading threshold or rejected if the current loading condition is not below the loading threshold. In another example, the determination of block 904 may be based on operator policy (e.g., on-demand PDCCH monitoring location is turned off or on per operator policy, with block 904 rejecting the request if turned off or granting the request if turned on). In other designs, the various network criteria noted above and/or other network criteria may be used in combination with each other and/or in combination with the operational condition(s) monitored at the UE. In another example, the request of block 902 may be received in association with information that is based upon monitoring, by the UE, of a set of operational conditions, as described above with respect to FIG. 8. If such information is received in association with the request of block 902, then this information may optionally be factored into the determination at block 904 (e.g., if the estimated traffic volume at the UE is very high and conveyed to the base station, this may bias the base station in favor of granting the request from block 902, etc.). The set of operational conditions for which information may be received in association with the request may correspond to any combination of the operational conditions described above with respect to FIG. 8 (e.g., BLER, estimated traffic volume, UE charging status, etc.).

As further shown in FIG. 9, in some aspects, process 900 may optionally include transmitting (e.g., via antenna(s) 234*a* . . . 234*r*, TX MIMO processor 230, modulators(s) 232*a* . . . 232*r*, TX processor 220), to the UE, the indication identifying the PDCCH monitoring location associated with transmitting the next DCI communication (block 906). In an example, block 906 is optional and need not be performed if the base station determines not to grant the request at block 904. In an example, the optional transmission at block 906 may occur via a DCI communication or a MAC CE. In an example, the identified PDCCH monitoring location may be associated with a CORESET change. In this case, the request from block 902 may be characterized as a CORESET change request, and the determination from block 904 may be characterized as a determination as to whether to change the CORESET.

As further shown in FIG. 9, in some aspects, process 900 may optionally include transmitting (e.g., via antenna(s) 234*a* . . . 234*r*, TX MIMO processor 230, modulators(s) 232*a* . . . 232*r*, TX processor 220), to the UE, a notification that the base station has rejected the UE's request from block 902 (block 908). In an example, block 908 is optional and need not be performed if the base station determines to grant the request at block 904.

Process 900 may include additional aspects, such as any single aspect or any combination of aspects described below and/or in connection with one or more other processes described elsewhere herein. Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
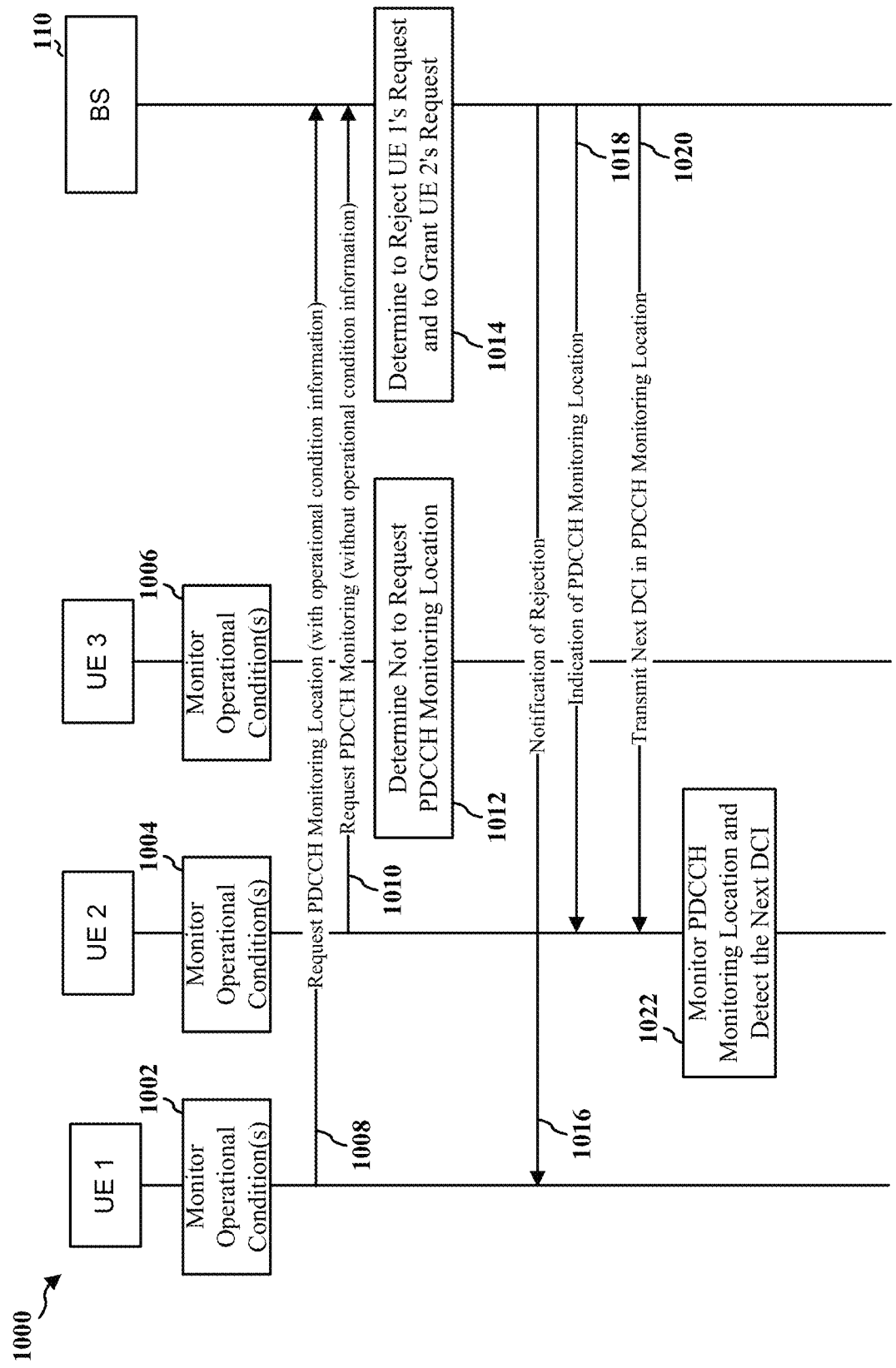
FIG. 10 illustrates example implementations of the processes of FIGS. 8-9 in accordance with an embodiment of the disclosure.

FIG. 10 illustrates example implementations 1000 of the processes 800-900 of FIGS. 8-9 in accordance with an embodiment of the disclosure. In particular, FIG. 10 depicts different implementations of at least some part of the processes 800-900 of FIGS. 8-9 with respect to each of UEs 1, 2 and 3 (and their communicative interactions with a respective serving base station 110).

Referring to FIG. 10, UEs 1-3 each monitor a respective set of operational conditions at blocks 1002-1006 (e.g., as in block 802 of FIG. 8). The respective sets of operational conditions being monitored by UEs 1-3 may be the same or different (or may overlap in part). The monitoring of blocks 1002-1004 results in UEs 1 and 2 each transmitting requests for indications of PDCCH monitoring locations to the base station 110 at blocks 1008-1010, respectively (e.g., as in block 808 of FIG. 8 or block 902 of FIG. 9). In this example, UE 1's request at block 1008 is supplemented with monitored operational condition information, while UE 2's request at block 1010 is not supplemented with monitored operational condition information. At block 1012, UE 3 determines not to transmit a request for an indication of a PDCCH monitoring location.

Referring to FIG. 10, at block 1014, the BS 110 determines to reject UE 1's request and to grant UE 2's request (e.g., as in block 904 of FIG. 9). At block 1016, the BS 110 transmits a notification of rejection to UE 1 (e.g., as in block 812 of FIG. 8 or block 908 of FIG. 9). At block 1018, the BS 110 transmits the indication of PDCCH monitoring location associated with transmitting a next DCI communication (e.g., as in block 810 of FIG. 8 or block 906 of FIG. 9). At block 1020, the BS 110 transmits the next DCI in the PDCCH monitoring location in accordance with the indication from bloc 1018. At block 1022, UE 2 monitors in the PDCCH monitoring location in accordance with the indication from block 1018 and detects the DCI contained therein (e.g., as in blocks 814-816 of FIG. 8).

Figure 11:
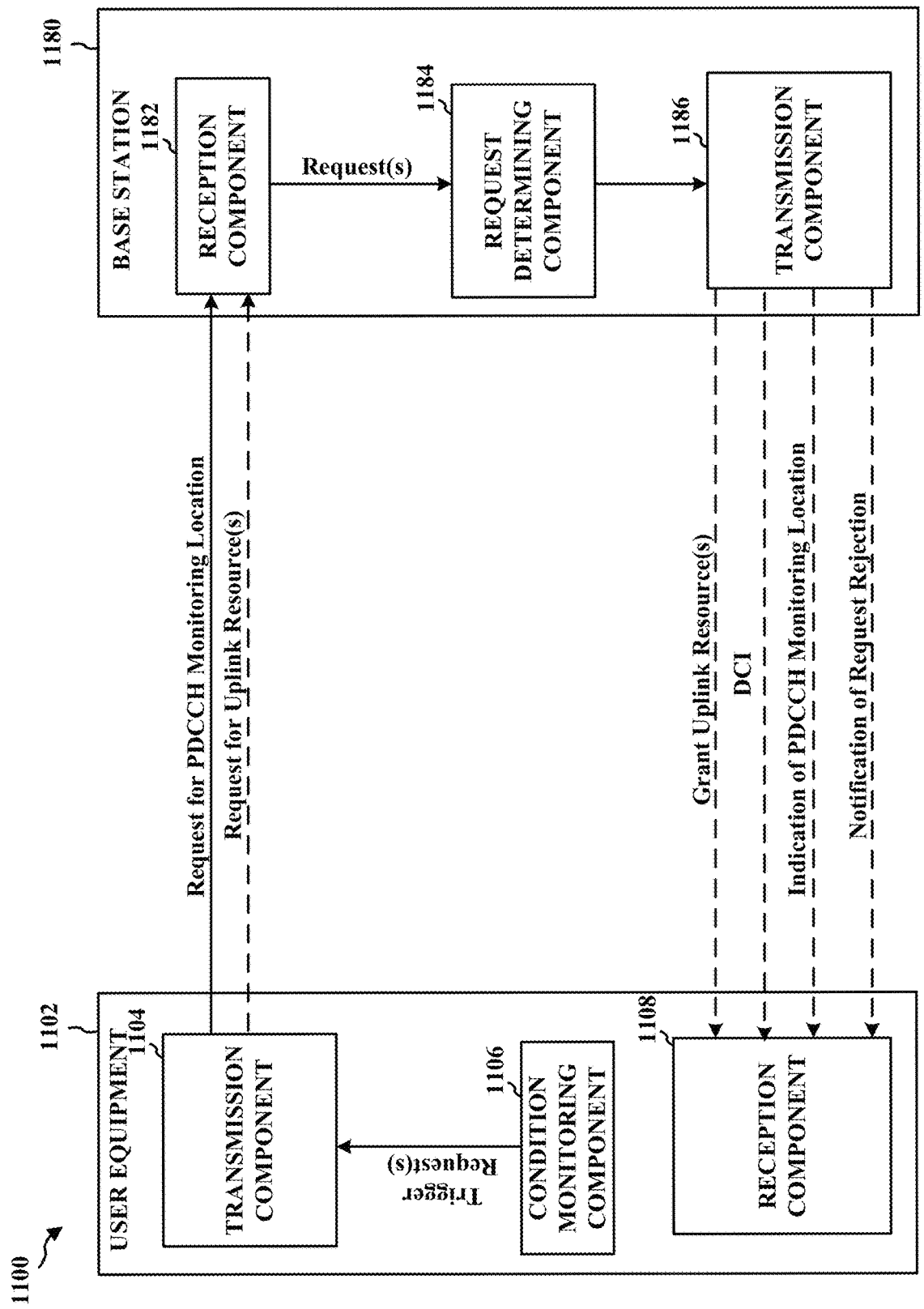
FIG. 11 is a conceptual data flow diagram illustrating the data flow between different means/components in exemplary apparatuses in accordance with an embodiment of the disclosure.

FIG. 11 is a conceptual data flow diagram 1100 illustrating the data flow between different means/components in exemplary apparatuses 1102 and 1180 in accordance with an embodiment of the disclosure. The apparatus 1102 may be a UE (e.g., UE 120) in communication with an apparatus 1180, which may be a base station (e.g., base station 110).

The apparatus 1102 includes a transmission component 1104, which may correspond to transmitter circuitry in UE 120 as depicted in FIG. 2, including controller/processor 280, antenna(s) 252a . . . 252r, modulators(s) 254a . . . 254r, TX MIMO processor 266, TX processor 264. The apparatus 1106 further includes a condition monitoring component 1106, which may correspond to processor circuitry in UE 120 as depicted in FIG. 2, including controller/processor 280, etc. The apparatus 1102 further includes a reception component 1108, which may correspond to receiver circuitry in UE 120 as depicted in FIG. 2, including controller/processor 280, antenna(s) 252a . . . 252r, demodulators(s) 254a . . . 254r, MIMO detector 256, RX processor 258.

The apparatus 1180 includes a reception component 1182, which may correspond to receiver circuitry in BS 110 as depicted in FIG. 2, including controller/processor 240, antenna(s) 234a . . . 234r, demodulators(s) 232a . . . 232r, MIMO detector 236, RX processor 238, communication unit 244. The apparatus 1180 further a includes a request determining component 1184, which may correspond to processor circuitry in BS 110 as depicted in FIG. 2, including controller/processor 240. The apparatus 1180 further includes a transmission component 1186, which may correspond to transmission circuitry in BS 110 as depicted in FIG. 2, including e.g., controller/processor 240, antenna(s) 234a . . . 234r, modulators(s) 232a . . . 232r, Tx MIMO processor 230, TX processor 220, communication unit 244.

Referring to FIG. 11, the condition monitoring component 1106 monitors various operational conditions associated with the apparatus 1102 so as to selectively trigger the transmission component 1104 to transmit a request for a PDCCH monitoring location from the apparatus 1180. In some cases, transmission of the request for a PDCCH monitoring location may optionally involve a request/grant procedure with respect to uplink resource(s). In such cases, the transmission component 1104 transmits a request for uplink resource(s) to the reception component 1182 at the apparatus 1180. The request determining component 1184 determines to grant the request for uplink resource(s), and signals the transmission component 1186 to convey a grant of the requested uplink resource(s) back to the reception component 1108 of the apparatus 1102.

Referring to FIG. 11, the transmission component 1104 transmits a request for an indication of PDCCH monitoring location to the reception component 1182 at the apparatus 1180. The request determining component 1184 determines whether or not to grant the request for the indication of PDCCH monitoring location. If the request determining component 1184 determines to grant this request, then the transmission component 1186 transmits the indication of the PDCCH monitoring location to the reception component 1108. The transmission component 1186 may then transmit a DCI communication in accordance with the indication of the PDCCH monitoring location. If the request determining component 1184 determines not to grant this request, then the transmission component 1186 may optionally transmit a notification of rejection to the reception component 1108

One or more components of the apparatus 1102 and apparatus 1180 may perform each of the blocks of the algorithm in the aforementioned flowcharts of FIGS. 8-10. As such, each block in the aforementioned flowcharts of FIGS. 8-10 may be performed by a component and the apparatus 1102 and apparatus 1180 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
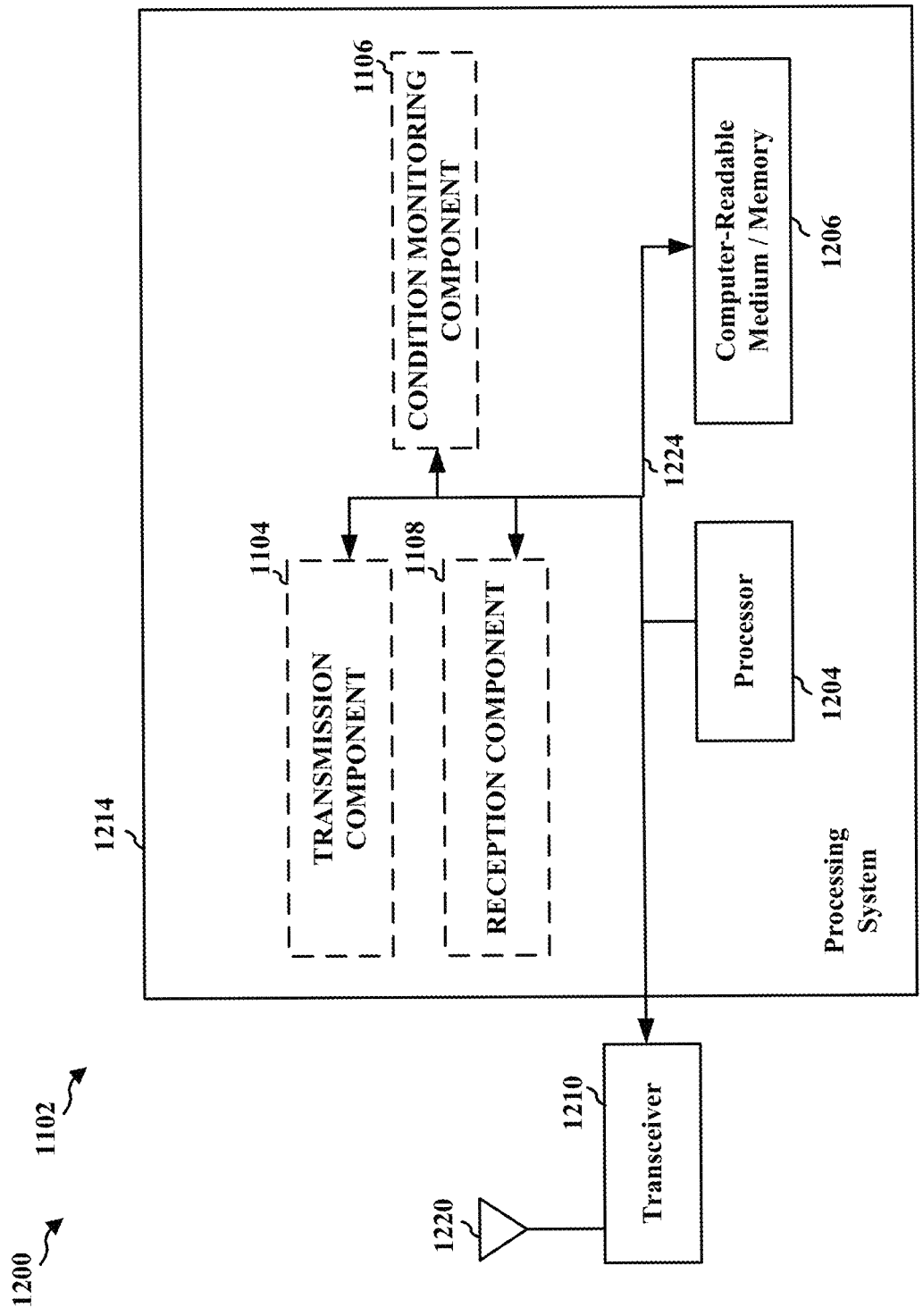
FIG. 12 is a diagram illustrating an example of a hardware implementation for an apparatus employing a processing system.

FIG. 12 is a diagram 1200 illustrating an example of a hardware implementation for an apparatus 1102 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106 and 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1108. In addition, the transceiver 1210 receives information from the processing system 1214, specifically the transmission component 1104, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106 and 1108. The components may be software components running in the processor 1204, resident/stored in the computer readable medium/memory 1206, one or more hardware components coupled to the processor 1204, or some combination thereof. The processing system 1214 may be a component of the UE 120 of FIG. 2 and may include the memory 282, and/or at least one of the TX processor 264, the RX processor 258, and the controller/processor 280.

In one configuration, the apparatus 1102 (e.g., a UE) for wireless communication includes means for monitoring a set of operational conditions associated with the UE, means for transmitting, based on the monitoring, a request for an indication identifying a PDCCH monitoring location associated with receiving a next DCI communication, and means for monitoring in the PDCCH monitoring location if the indication is received in response to the request. In some configurations, the apparatus 1102 for wireless communication further includes means for transmitting a request for one or more uplink resources, and means for receiving a grant of the one or more uplink resources in response to the request. In some configurations, the apparatus 1102 for wireless communication further includes means for receiving the indication identifying the PDCCH monitoring location in response to the request. In some configurations, the apparatus 1102 for wireless communication further includes means for detecting the next DCI communication based on the monitoring in the PDCCH monitoring location. In some configurations, the apparatus 1102 for wireless communication further includes means for receiving a notification of a rejection of a request by the base station. The aforementioned means may be one or more of the aforementioned components of the apparatus 1102 and/or the processing system 1214 of the apparatus 1102 configured to perform the functions recited by the aforementioned means. As described supra, the processing system 1214 may include the TX processor 264, the RX processor 258, and the controller/processor 280.

Figure 13:
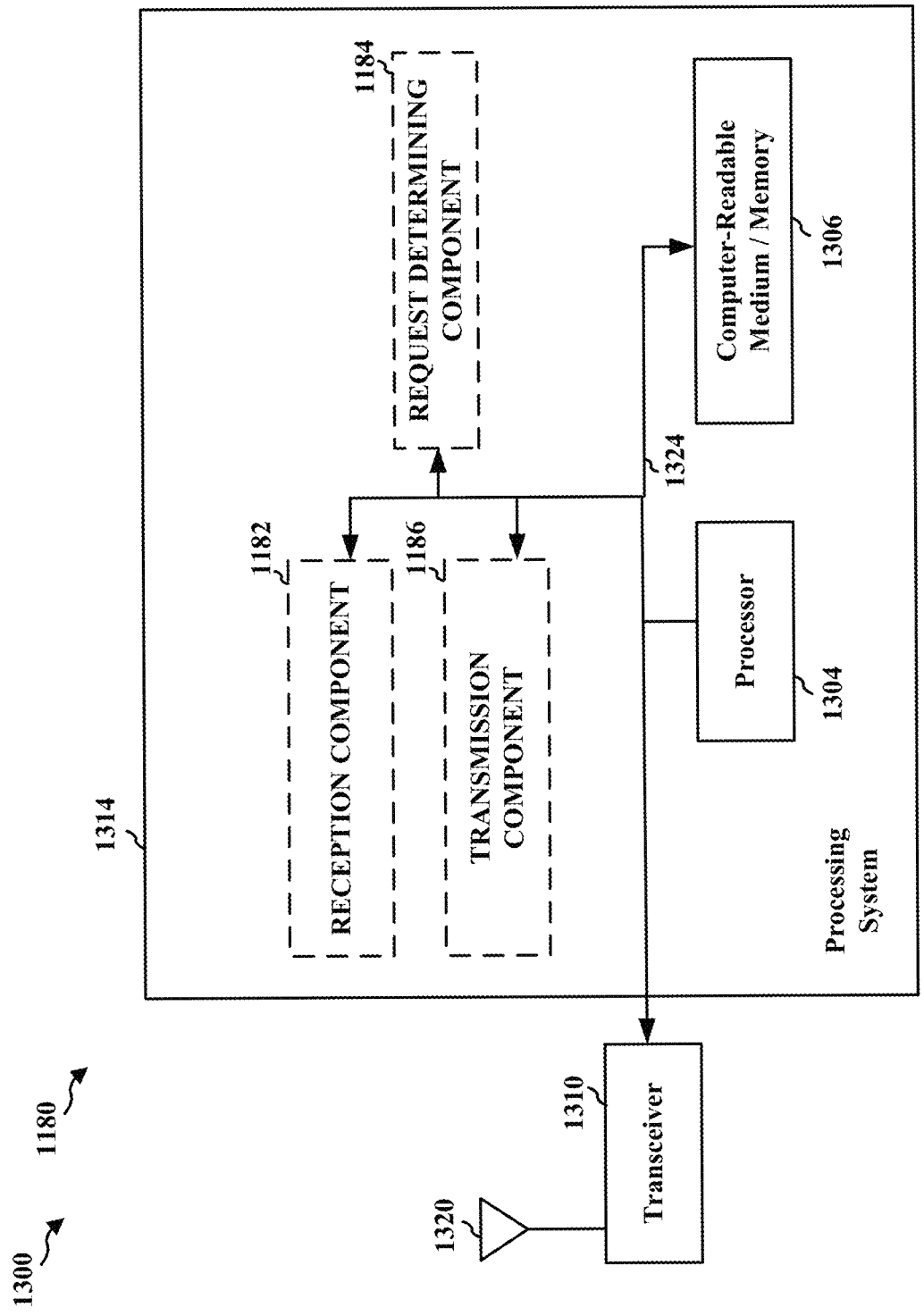
FIG. 13 is a diagram illustrating another example of a hardware implementation for an apparatus employing a processing system.

FIG. 13 is a diagram 1300 illustrating an example of a hardware implementation for an apparatus 1180 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1182, 1184 and 1186, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1182. In addition, the transceiver 1310 receives information from the processing system 1314, specifically the transmission component 1186, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1182, 1184 and 1186. The components may be software components running in the processor 1304, resident/stored in the computer readable medium/memory 1306, one or more hardware components coupled to the processor 1304, or some combination thereof. The processing system 1314 may be a component of the BS 110 of FIG. 2 and may include the memory 242, and/or at least one of the TX processor 220, the RX processor 238, and the controller/processor 240.

In one configuration, the apparatus 1180 (e.g., a BS) for wireless communication includes means for receiving, from a UE, a request for an indication identifying a PDCCH monitoring location associated with transmitting a next DCI communication, and means for determining whether to grant the request. In some configurations, the apparatus 1180 for wireless communication further includes means for transmitting, to the UE, the indication identifying the PDCCH monitoring location associated with transmitting the next DCI communication. In some configurations, the apparatus 1180 for wireless communication further includes means for transmitting, to the UE, a notification of a rejection of a request. The aforementioned means may be one or more of the aforementioned components of the apparatus 1180 and/or the processing system 1314 of the apparatus 1180 configured to perform the functions recited by the aforementioned means. As described supra, the processing system 1314 may include the TX processor 220, the RX processor 238, and the controller/processor 240.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   monitoring a set of operational conditions associated with the UE;
   transmitting, based on the monitoring, a first request for an indication identifying a a search space identifier, a control resource set (CORESET) identifier or both for a physical downlink control channel (PDCCH) monitoring location associated with receiving a next downlink control information (DCI) communication;
   receiving the indication identifying the PDCCH monitoring location in response to the first request and in advance of the PDDCH monitoring location; and
   monitoring in the PDCCH monitoring location in response to the indication.

2. The method of claim 1,
   wherein at least one of the set of operational conditions is associated with a channel between the UE and a wireless network component, or
   wherein at least one of the set of operational conditions is associated with a state of the UE, or
   wherein the set of operational conditions includes an estimated traffic volume of the UE on one or more uplink resources of the channel, or
   wherein the set of operational conditions includes a traffic pattern characteristic on by the UE on one or more uplink resources of the channel, or
   wherein the set of operational conditions includes an error rate on the channel, or
   wherein the at least one of the set of operational conditions includes a power state of the UE, or
   a combination thereof.

3. The method of claim 2, wherein the channel comprises a physical uplink shared channel (PUSCH) that includes one or more uplink resources allocated to the UE.

4. The method of claim 2, wherein the set of operational conditions includes whether the channel includes one or more uplink resources that are allocated to the UE in accordance with a semi-persistent scheduling (SPS) or configured grant (CG) protocol.

5. The method of claim 4, wherein the transmission of the first request is triggered if the one or more uplink resources are not allocated with the SPS or CG protocol.

6. The method of claim 2, wherein the transmission of the first request is triggered if the estimated traffic volume exceeds a traffic volume threshold.

7. The method of claim 2, wherein the transmission of the first request is triggered if the traffic pattern characteristic of the channel is associated with aperiodic traffic, periodic traffic during an interval exceeds an interval threshold, or a combination thereof.

8. The method of claim 2, wherein the transmission of the first request is triggered if the error rate on the channel is below an error rate threshold.

9. The method of claim 2, wherein the power state of the UE comprises a battery charge level of the UE, a charging status of the UE, or a combination thereof.

10. The method of claim 9, wherein the transmission of the first request is triggered if the battery charge level of the UE is lower than a charge threshold, if the charging status of the UE indicates that the UE is not charging, or a combination thereof.

11. The method of claim 1, further comprising:
    transmitting a second request for one or more uplink resources; and
    receiving a grant of the one or more uplink resources in response to the second request,
    wherein the first request for the indication is transmitted on the one or more uplink resources.

12. The method of claim 11, wherein the one or more uplink resources are associated with a physical uplink control channel (PUCCH) or a medium access control (MAC) command element (CE).

13. The method of claim 1, wherein the indication is received via a DCI communication or a medium access control (MAC) command element (CE).

14. The method of claim 1, further comprising:
    detecting the next DCI communication based on the monitoring in the PDCCH monitoring location.

15. The method of claim 1, wherein the indication is associated with a change to one or more CORESETs of the UE.

16. The method of claim 1, further comprising:
    receiving, from a wireless network component, a notification of a rejection.

17. The method of claim 1, wherein the first request comprises information from the set of operational conditions which triggers the transmission of the first request.

18. A method of wireless communication performed by a wireless network component, comprising:
    receiving, from a user equipment (UE), a request for an indication identifying a a search space identifier, a control resource set (CORESET) identifier or both for a physical downlink control channel (PDCCH) monitoring location associated with transmitting a next downlink control information (DCI) communication;
    determining to grant the request; and
    sending, to the UE in response to the determination and in advance of the PDCCH monitoring location, the indication identifying the PDCCH monitoring location associated with transmitting the next DCI communication.

19. The method of claim 18, wherein the indication is associated with a change to one or more CORESETs of the UE.

20. The method of claim 18, wherein the determination is based in part on one or more network criteria comprising a loading condition, an operator policy, a permission associated with the UE, or a combination thereof.

21. The method of claim 18,
wherein the request is received in association with information that is based upon monitoring, by the UE, of a set of operational conditions, and
wherein the determination is based in part on the received information.

22. The method of claim 21,
wherein at least one of the set of operational conditions is associated with a channel between the UE and the wireless network component,
wherein one or more of the set of operational conditions are associated with a state of the UE, or
a combination thereof.

23. A user equipment (UE), comprising:
a memory; and
at least one processor coupled to the memory and configured to:
monitor a set of operational conditions associated with the UE;
transmit, based on the monitoring, a request for an indication identifying a a search space identifier, a control resource set (CORESET) identifier or both for a physical downlink control channel (PDCCH) monitoring location associated with receiving a next downlink control information (DCI) communication;
receive the indication identifying the PDCCH monitoring location in response to the request and in advance of the PDDCH monitoring location; and
monitor in the PDCCH monitoring location in response to the indication.

24. The UE of claim 23,
wherein at least one of the set of operational conditions is associated with a channel between the UE and a wireless network component, or
wherein at least one of the set of operational conditions is associated with a state of the UE, or
wherein the set of operational conditions includes an estimated traffic volume of the UE on one or more uplink resources of the channel, or
wherein the set of operational conditions includes a traffic pattern characteristic on by the UE on one or more uplink resources of the channel, or
wherein the set of operational conditions includes an error rate on the channel, or
wherein the at least one of the set of operational conditions includes a power state of the UE, or
any combination thereof.

25. A wireless network component, comprising:
a memory; and
at least one processor coupled to the memory and configured to:
receive, from a user equipment (UE), a request for an indication identifying a a search space identifier, a control resource set (CORESET) identifier or both for a physical downlink control channel (PDCCH) monitoring location associated with transmitting a next downlink control information (DCI) communication;
determine to grant the request; and
transmit, to the UE in response to the determination and in advance of the PDCCH monitoring location, the indication identifying the PDCCH monitoring location associated with the transmitting the next DCI communication.

* * * * *